(12) United States Patent
Mukasa et al.

(10) Patent No.: US 10,349,254 B2
(45) Date of Patent: Jul. 9, 2019

(54) INFORMATION PROCESSING SYSTEM AND COMMUNICATION METHOD

(71) Applicants: Shinya Mukasa, Shizuoka (JP); Shuuichi Nakamura, Kanagawa (JP)

(72) Inventors: Shinya Mukasa, Shizuoka (JP); Shuuichi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/977,042

(22) Filed: May 11, 2018

(65) Prior Publication Data

US 2018/0262893 A1 Sep. 13, 2018

Related U.S. Application Data

(63) Continuation of application No. 15/491,219, filed on Apr. 19, 2017, now Pat. No. 9,998,851, which is a
(Continued)

(30) Foreign Application Priority Data

Jan. 20, 2015 (JP) .................................. 2015-008514

(51) Int. Cl.
*H04N 7/00* (2011.01)
*H04W 4/80* (2018.01)
(Continued)

(52) U.S. Cl.
CPC ............. *H04W 4/80* (2018.02); *H04L 65/403* (2013.01); *H04L 67/16* (2013.01); *H04M 3/567* (2013.01); *H04N 7/15* (2013.01); *H04W 8/005* (2013.01)

(58) Field of Classification Search
CPC ..... H04W 84/12; H04W 84/18; H04W 84/22; H04W 88/12; H04W 88/14;
(Continued)

(56) References Cited

U.S. PATENT DOCUMENTS 8,976,386 B2 3/2015 Mukasa
9,661,449 B2 5/2017 Mukasa et al.
(Continued)

FOREIGN PATENT DOCUMENTS

EP 2806614 11/2014
JP 2010-069686 4/2010
(Continued)

OTHER PUBLICATIONS

Extended European Search Report dated Mar. 24, 2016 for EP16151710.7 filed on Jan. 18, 2016.

*Primary Examiner* — Lee Nguyen
(74) *Attorney, Agent, or Firm* — IPUSA, PLLC

(57) ABSTRACT

An information processing system includes a mobile terminal including an electric wave receiving unit configured to receive an electric wave that includes belonging information of an electronic apparatus sent by a short range wireless communication, and an electronic apparatus display unit configured to receive a selection of the belonging information from a user, and request the information processing apparatus to perform a use start of the at least one electronic apparatus, the information processing apparatus including an information administration unit configured to read the information from a memory unit, which stores the belonging information and the at least one electronic apparatus, in response to the request from the mobile terminal to send the information, and return the read information to the mobile terminal, and an apparatus connection administration unit configured to request the at least one electronic apparatus to start a preparation of the use start.

15 Claims, 20 Drawing Sheets

Related U.S. Application Data continuation of application No. 14/994,294, filed on Jan. 13, 2016, now Pat. No. 9,661,449.

(51) Int. Cl.
| | |
|---|---|
| *H04L 29/06* | (2006.01) |
| *H04M 3/56* | (2006.01) |
| *H04N 7/15* | (2006.01) |
| *H04L 29/08* | (2006.01) |
| *H04W 8/00* | (2009.01) |
| *H04B 1/00* | (2006.01) |

(58) Field of Classification Search
CPC ......... H04M 1/72519; H04M 1/72522; H04M 1/7253; H04M 1/72533
USPC ................................. 455/41.2–41.3; 370/338
See application file for complete search history.

(56) References Cited

U.S. PATENT DOCUMENTS

| | | | |
|---|---|---|---|
| 9,998,851 B2* | 6/2018 | Mukasa | ................ H04L 65/403 |
| 2013/0033679 A1 | 2/2013 | Mukasa | |
| 2013/0163812 A1 | 6/2013 | Mukasa | |
| 2014/0043361 A1 | 2/2014 | Mukasa | |
| 2014/0146745 A1 | 5/2014 | Huang et al. | |
| 2014/0258334 A1 | 9/2014 | Mukasa | |
| 2014/0337928 A1 | 11/2014 | Hirakata et al. | |
| 2015/0082457 A1 | 3/2015 | Nakamura et al. | |

FOREIGN PATENT DOCUMENTS

| | | |
|---|---|---|
| JP | 2010-074420 | 4/2010 |
| JP | 2013-146048 | 7/2013 |

\* cited by examiner

| APPARATUS NAME | APPARATUS TYPE | IP ADDRESS | BELONGING MEETING ROOM |
|---|---|---|---|
| PROJECTOR A | PROJECTOR | 111.111.111.111 | MEETING ROOM A |
| PROJECTOR B | PROJECTOR | 111.111.111.121 | MEETING ROOM B |
| PRINTER A | PRINTER | 111.111.111.112 | MEETING ROOM A |
| PRINTER B | PRINTER | 111.111.111.122 | MEETING ROOM B |
| INTERACTIVE WHITEBOARD A | INTERACTIVE WHITEBOARD | 111.111.111.113 | MEETING ROOM A |
| INTERACTIVE WHITEBOARD B | INTERACTIVE WHITEBOARD | 111.111.111.123 | MEETING ROOM B |

FIG.8

| APPARATUS | BROADCASTED INFORMATION (MEETING ROOM) |
|---|---|
| PROJECTOR A | MEETING ROOM A |
| PROJECTOR B | MEETING ROOM B |
| PRINTER A | MEETING ROOM A |
| PRINTER B | MEETING ROOM B |
| INTERACTIVE WHITEBOARD A | MEETING ROOM A |
| INTERACTIVE WHITEBOARD B | MEETING ROOM B |

FIG.14

| APPARATUS NAME | APPARATUS TYPE | IP ADDRESS | BELONGING MEETING ROOM | TOKEN |
|---|---|---|---|---|
| PROJECTOR A | PROJECTOR | 111.111.111.111 | MEETING ROOM A | aaa |
| PROJECTOR B | PROJECTOR | 111.111.111.121 | MEETING ROOM B | bbb |
| PRINTER A | PRINTER | 111.111.111.112 | MEETING ROOM A | ccc |
| PRINTER B | PRINTER | 111.111.111.122 | MEETING ROOM B | ddd |
| INTERACTIVE WHITEBOARD A | INTERACTIVE WHITEBOARD | 111.111.111.113 | MEETING ROOM A | eee |
| INTERACTIVE WHITEBOARD B | INTERACTIVE WHITEBOARD | 111.111.111.123 | MEETING ROOM B | fff |

FIG.15

| APPARATUS | BROADCASTED INFORMATION (MEETING ROOM) | TOKEN |
|---|---|---|
| PROJECTOR A | MEETING ROOM A | aaa |
| PROJECTOR B | MEETING ROOM B | bbb |
| PRINTER A | MEETING ROOM A | ccc |
| PRINTER B | MEETING ROOM B | ddd |
| INTERACTIVE WHITEBOARD A | MEETING ROOM A | eee |
| INTERACTIVE WHITEBOARD B | MEETING ROOM B | fff |

FIG.22

| USER | AUTHORITY |
|---|---|
| USER A | MFP(COPY), PJ |
| USER B | MFP(PRINT, COPY), PJ, IWB |
| USER C | MFP(SCAN, PRINT, COPY), IWB |
| USER D | MFP, PJ, IWB, ⋯ |
| ⋮ | ⋮ |

INFORMATION PROCESSING SYSTEM AND COMMUNICATION METHOD

CROSS-REFERENCE TO RELATED APPLICATIONS

This application is a continuation application filed under 35 U.S.C. 111(a) claiming the benefit under 35 U.S.C. 120 of U.S. patent application Ser. No. 15/491,219 filed on Apr. 19, 2017, which is a continuation application filed under 35 U.S.C. 111(a) claiming the benefit under 35 U.S.C. 120 of U.S. patent application Ser. No. 14/994,294 filed on Jan. 13, 2016, which is based upon and claims the benefit of priority of Japanese Priority Patent Application No. 2015-008514 filed on Jan. 20, 2015, the entire contents of which are incorporated herein by reference.

BACKGROUND OF THE INVENTION

1. Field of the Invention

The present invention relates to an information processing system and a communication method.

2. Description of the Related Art

In recent years, many electronic apparatuses such as a projector and a printer are prepared for network communications including wireless communication. In many cases when the electronic apparatus is used from a mobile terminal such as a smart device or a PC, the mobile terminal is connected to the electronic apparatus by a network communication without directly connecting the mobile terminal to the electronic apparatus by a cable. For example, a method of causing a user to designate an electronic apparatus among multiple electronic apparatuses connected by a network communication is that a view of the electronic apparatuses in the same subnet is presented to a user and the user selects the electronic apparatus to be used from the view.

For example, when a response device such as a printer responds to a request from a request device such as a Personal Digital Assistant (PDA), a request device displays an attribute of a response device enabled to communicate on a display unit and a selection of the attribute displayed on the display unit is received by the user to receive a selection of a group of the response device having the attribute (for example, Patent Document 1).

Patent Document 1: Japanese Laid-Open Patent Publication No. 2010-69686

However, the method of causing the user to select the electronic apparatus from the view of the electronic apparatuses inside the searched same subnet has a problem that it is difficult for the user to find the desired electronic apparatus from the view. Therefore, the method of causing the user to select the electronic apparatus from the view of the electronic apparatuses inside the searched same subnet may face a case where it is not easy for the user to find the desired electronic apparatus.

SUMMARY OF THE INVENTION

It is an object of at least one embodiment of the present invention to provide an information processing system in which a user may easily select the desired electronic apparatus.

It is a general object of at least one embodiment of the present invention to provide an information processing system that substantially obviates one or more problems caused by the limitations and disadvantages of the related art.

One aspect of the embodiments of the present invention may be to provide an information processing system including an information processing apparatus and a mobile terminal, which are connected through a network, wherein the mobile terminal including an electric wave receiving unit configured to receive an electric wave that includes belonging information of an electronic apparatus sent from the electronic apparatus by a short range wireless communication; and an electronic apparatus display unit configured to request the information processing apparatus to send information of at least one of the electronic apparatus corresponding to the belonging information while designating the belonging information included in the electric wave, display the information of the at least one electronic apparatus acquired from the information processing apparatus, receive a selection of the belonging information from a user, and request the information processing apparatus to perform a use start of the at least one electronic apparatus while designating the belonging information, wherein the information processing apparatus including an information administration unit configured to read the information of the at least one electronic apparatus corresponding to the designated belonging information from a memory unit, which stores the belonging information and the at least one electronic apparatus while associating the belonging information with the at least one electronic apparatus, in response to the request from the mobile terminal to send the information of the at least one electronic apparatus while designating the belonging information, and return the read information of the at least one electronic apparatus to the mobile terminal; and an apparatus connection administration unit configured to receive the request from the mobile terminal to perform the use start of the at least one electronic apparatus, and request the at least one electronic apparatus to start a preparation of the use start.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 8 illustrates an exemplary meeting room information piece included in a BLE electric wave.

FIG. 14 illustrates another exemplary structure of information of an office apparatus stored in an apparatus information memory unit.

FIG. 15 illustrates an exemplary meeting room information piece and a token included in a BLE electric wave.

FIG. 22 illustrates an exemplary structure of an authority table.

DETAILED DESCRIPTION OF THE PREFERRED EMBODIMENTS

A description is given below, with reference to the FIG. 1 through FIG. 22 of embodiments of the present invention. Where the same reference symbols are attached to the same parts, repeated description of the parts is omitted.

First Embodiment

<System Structure>

Figure 1:
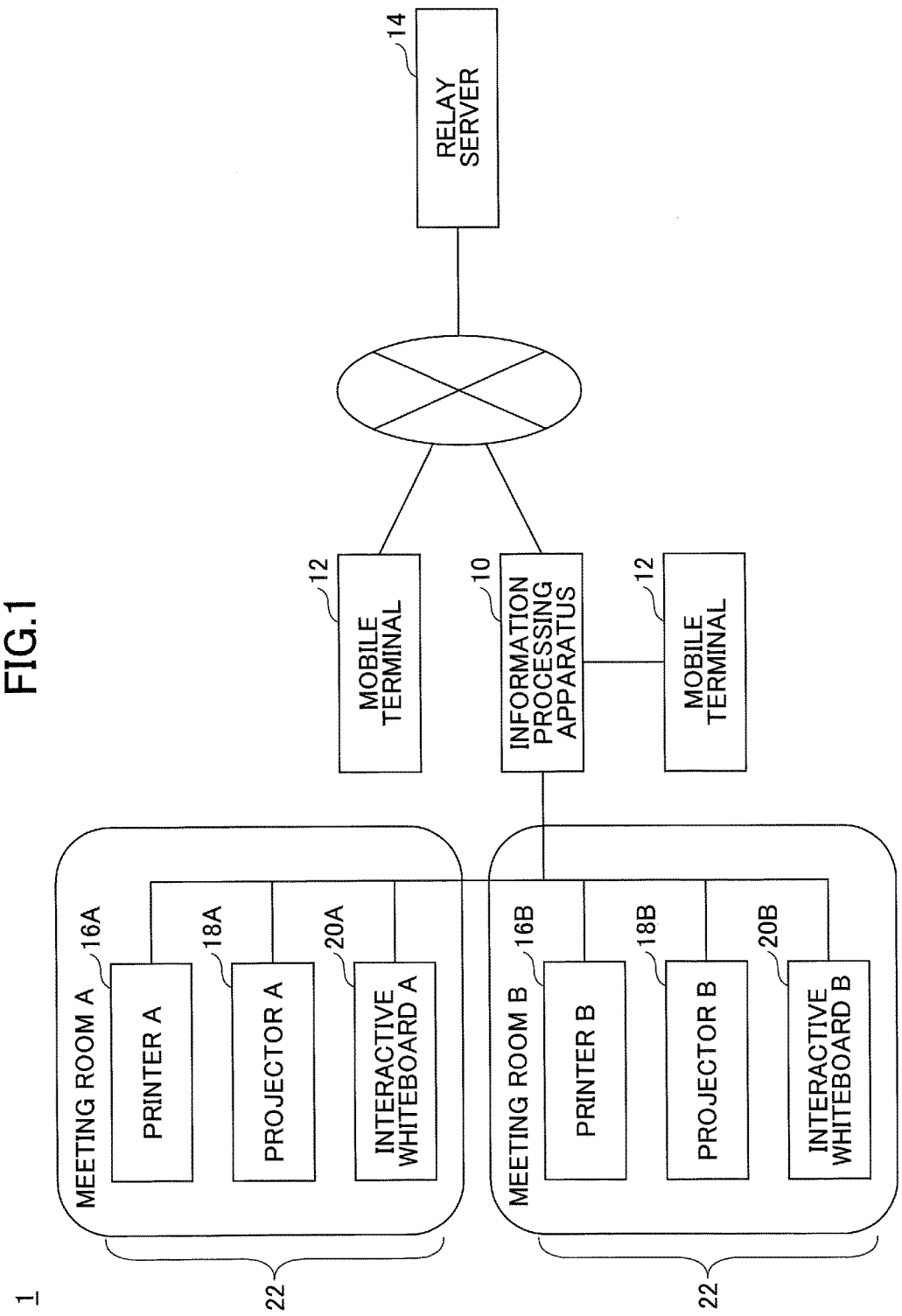
FIG. 1 illustrates an exemplary structure of an information processing system of an embodiment.

FIG. 1 illustrates a structure of an exemplary information processing system of a first embodiment. Referring to FIG. 1, the information processing system 1 includes an information processing apparatus 10, a mobile terminal 12, a relay server 14, a printer 16A, a printer 16B, a projector 18A, a projector 18B, and interactive whiteboards 20A and 20B.

The printer 16A, the printer 16B, the projector 18A, the projector 18B, and the interactive whiteboards 20A and 20B are examples of the office apparatus 22. Referring to FIG. 1, the printer 16A, the projector 18A, and the interactive whiteboard 20A are installed in the meeting room A, and the printer 16B, the projector 18B, and the interactive whiteboard 20B are installed in the meeting room B. The office apparatus 22 receives a Bluetooth Low Energy (BLE) electric wave (described later).

The office apparatus 22 is connected to the information processing apparatus 10 through a network such as a Local Area Network (LAN). The information processing apparatus 10 is connected to the mobile terminal 12 through a network such as a LAN. The information processing apparatus 10 is connected to the mobile terminal 12 through the relay server 14 installed in a network such as the Internet. The mobile terminal 12 receives the BLE electric wave described later.

The office apparatus 22 is an example of an electronic apparatus. While the office apparatus 22 is powered on, the office apparatus 22 sends out a BLE electric wave including meeting room information piece. In comparison with WiFi, the radio field intensity of the BLE electric wave is very weak. The reach of the BLE electric wave is kept within the area of the meeting room and a vicinity of the office apparatus 22 (for example, several meters).

The BLE electric wave is an example of a radio wave for a short range wireless communication. Therefore, the office apparatus 22 may send out an electric wave including the meeting room information using a short range wireless communication such as Bluetooth ("Bluetooth" is a registered trademark) and Near Field Communication (NFC).

The mobile terminal 12 is a terminal device operated by the user. The mobile terminal 12 is a terminal such as a smartphone, a mobile phone, a tablet PC, and a notebook PC, or the like operated by the user. The mobile terminal 12 is connected to the information processing apparatus 10 through a network such as a LAN. Further, the mobile terminal 12 is connectable to the relay server 14 using a phone line such as a 3G line. The mobile terminal 12 is connected to the information processing apparatus 10 through a relay server 14. The mobile terminal 12 receives a BLE electric wave sent by the office apparatus 22.

The information processing apparatus 10 receives an operation request of requesting to operate the office apparatus 22 from the mobile terminal 12 and operates the office apparatus 22 based on the operation request. The function of the information processing apparatus 10 may be distributed to multiple computers.

<Hardware Structure>

<<Computer>>

Figure 2:
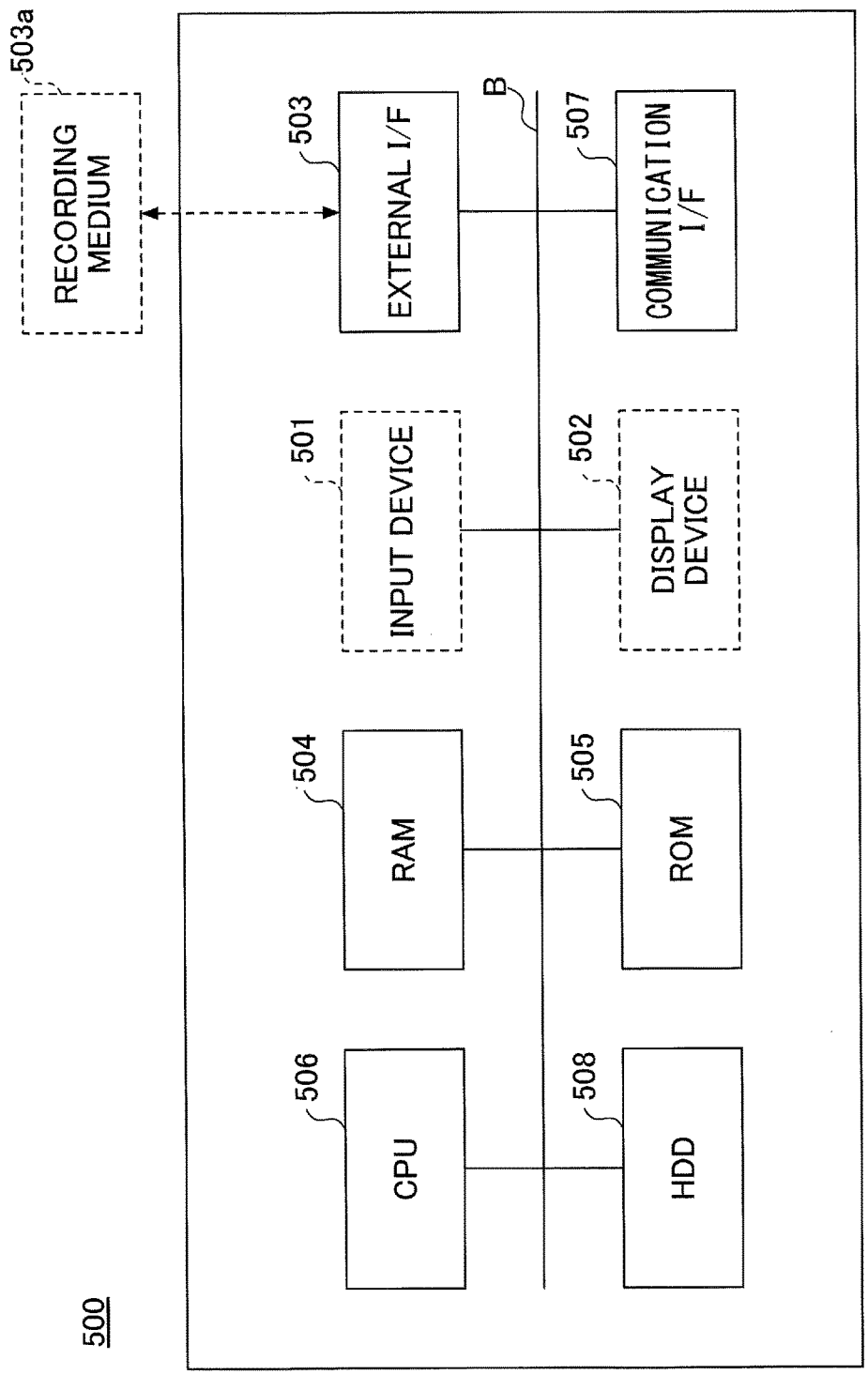
FIG. 2 illustrates a hardware structure of an exemplary computer of the embodiment.

The information processing apparatus 10 and the relay server 14 are substantialized by a computer having a hardware structure as illustrated in, for example, FIG. 2. FIG. 2 illustrates an exemplary hardware structure of the computer of the first embodiment.

Referring to FIG. 2, the computer 500 includes an input device 501, a display device 502, an external I/F 503, a RAM 504, a ROM 505, a CPU 506, a communication I/F 507, a HDD 508, and so on, mutually connected by a bus B. It is acceptable to form a structure such that the input device 501 and the display device 502 are connected when necessary.

The input device 501 includes a keyboard, a mouse, a touch panel, and so on, by which the user inputs various operation signals. The display device 502 includes a display or the like to display a processing result obtained by the computer 500.

The communication I/F 507 is an interface provided to connect the computer 500 with various networks. Thus, the computer 500 performs data communications through the communication I/F 507.

The HDD 508 is an exemplary non-volatile memory device that stores a program and data. The stored program and data are an operating system (OS), which is basic software controlling the entire computer 500, application software (hereinafter, simply referred to as an "application") providing various function capabilities in the OS, and so on. The computer 500 may use a drive device using a flash memory (e.g., a solid state drive (SSD)) as a memory medium in place of the HDD 508.

The external I/F 503 is an interface with an external device. The external device is a recording medium 503a or the like. With this, the computer 500 reads information from the recording medium 503a and/or writes information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data for a basic input/output system (BIOS), an OS setup, a network setup, and so on, which are executed at a time of booting up the computer 500. The RAM 504 is an example of a volatile semiconductor memory (a memory device) temporarily storing the program and/or the data.

The CPU 506 is an arithmetic device that reads the program and/or the data from the memory device such as the ROM 505, the HDD 508, and the like. The read program or the read data undergo a process so as to substantialize a control or a function capability of the entire computer 500.

The information processing apparatus 10 and the relay server 14 are substantialized by the hardware structure of the computer 500 as illustrated in, for example, FIG. 2.

<<Mobile Terminal>>

Figure 3:
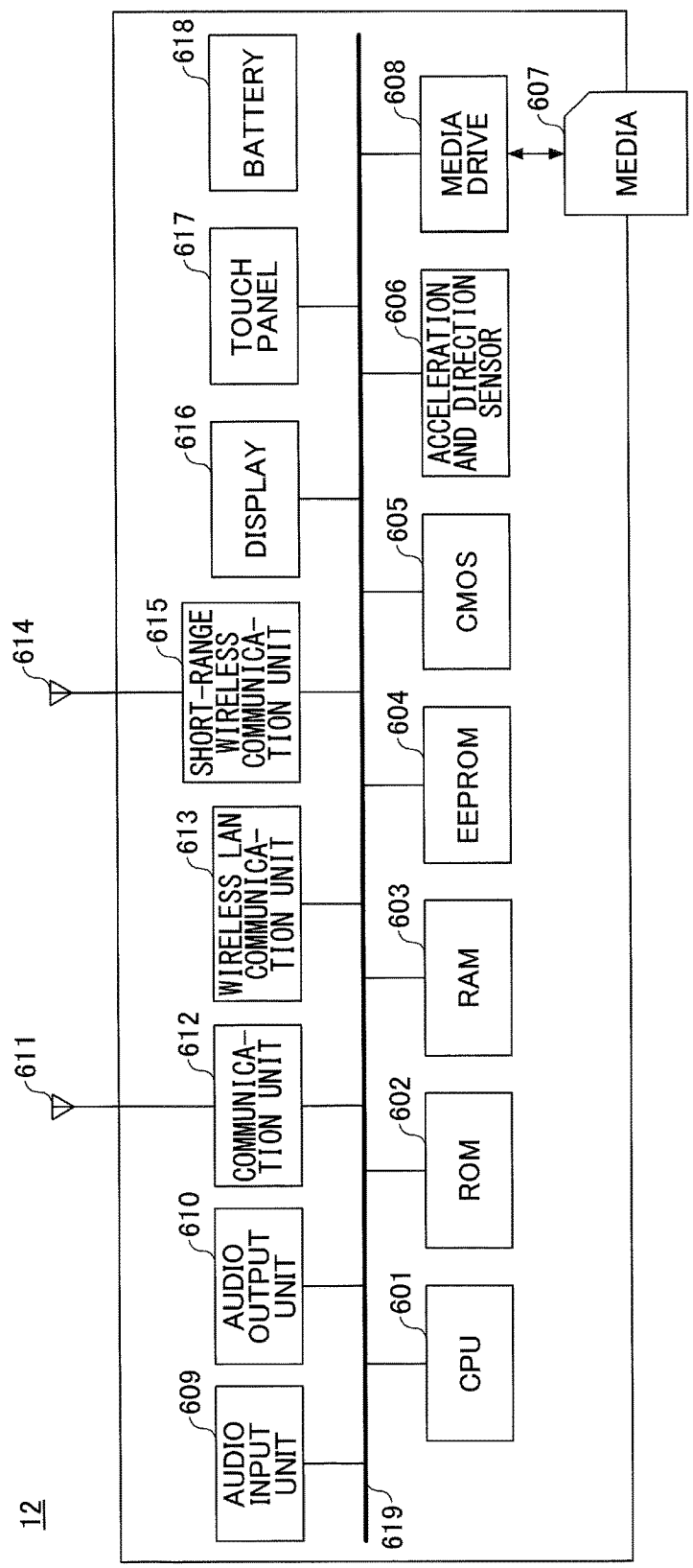
FIG. 3 illustrates an exemplary hardware structure of a mobile terminal of the embodiment.

For example, the mobile terminal 12 is substantialized by a hardware structure illustrated in, for example, FIG. 3. FIG. 3 illustrates an exemplary hardware structure of the mobile terminal of the embodiment. The mobile terminal 12 illustrated in FIG. 3 includes a CPU 601, a ROM 602, a RAM 603, an EEPROM 604, a CMOS sensor 605, an acceleration and direction sensor 606, and a media drive 608.

The CPU 601 controls the entire operation of the terminal apparatus 12. The ROM 602 stores a basic input and output program. The RAM 603 is used as a work area of the CPU 601. The EEPROM 604 reads or writes data in conformity with a control of the CPU 601. The CMOS sensor 605 captures image data in conformity with the control of the CPU 601 to acquire image data. The acceleration and direction sensor 606 is an electromagnetic compass that detects earth magnetism, a gyrocompass, an acceleration sensor, or the like.

The media drive 608 controls read or write (store) of data from or to a recordable media 607 such as a flash memory. Data already recorded in the recordable media 607 are read out or new data are written in the recordable media 607. The recordable media 607 is freely attachable or detachable with respect to the media drive 608.

The EEPROM 604 stores an operating system (OS) executed by the CPU 601, association information necessary for a network setup, or the like. An application for performing various processes of the first embodiment is stored in the EEPROM 604, the recordable media 607, or the like.

The CMOS sensor 605 is a charge-coupled device that converts light to electric charges and digitizes an image of an object. The CMOS sensor 605 may be substituted by, for example, a charge coupled device (CCD) sensor as long as the image of the object can be captured.

Further, the mobile terminal 12 includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts a sound to an audio signal. The audio output unit 610 converts the audio signal to the sound. The communication unit 612 uses the antenna 611 to communicate with the nearest base station apparatus by wireless communication signal. The wireless LAN communication unit 613 performs a wireless LAN communication with an access point in conformity with the standard IEEE 80411. The short range wireless communication unit 615 performs a short range wireless communication using the short range wireless communication antenna 614.

The display 616 is provided to display the image of the object, various icons, or the like. The display 616 is made of a liquid crystal, an organic EL, or the like. The touch panel 617 is mounted on the display 616 and is formed of a panel of a pressure sensitive type or a static type. A touch position on the display 616 is detected by a touch of a finger or a touch pen. The bus line 619 is an address bus, a data bus, or the like for electrically connecting the above units and parts.

The mobile terminal 12 includes a battery 618 for a dedicated use. The mobile terminal 12 is driven by the battery 618. The audio input unit 609 includes a microphone for inputting the sound. The audio output unit 610 includes a speaker for outputting the sound.

For example, the mobile terminal 12 is substantialized by the hardware structure illustrated in, for example, FIG. 3.

<Software Structure>

<<Information Processing Apparatus>>

Figure 4:
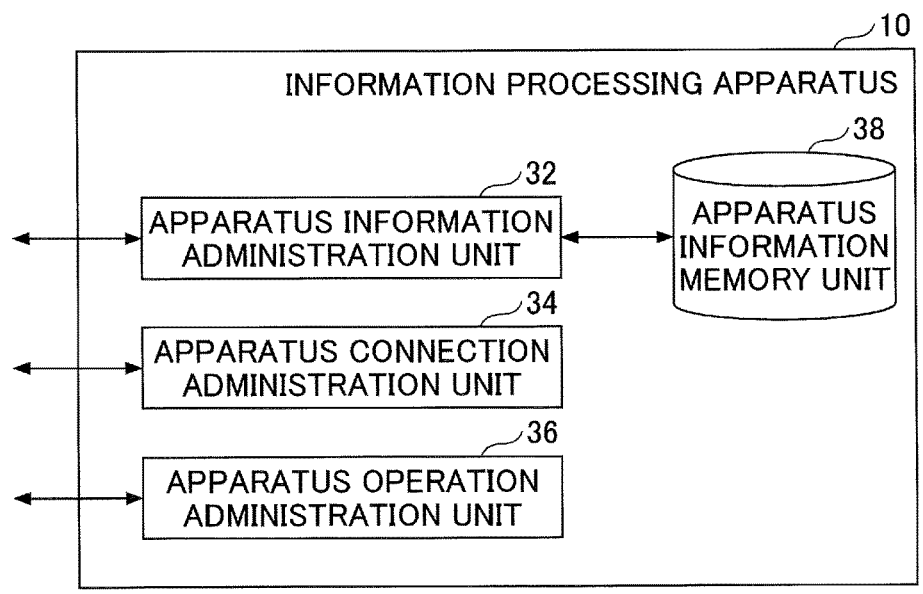
FIG. 4 is an exemplary processing block diagram of the information processing apparatus of the embodiment.

The information processing apparatus 10 of the first embodiment is substantialized by the processing block illustrated in, for example, FIG. 4. FIG. 4 is an exemplary processing block diagram of the information processing apparatus of the first embodiment. The information processing apparatus 10 substantializes an apparatus information administration unit 32, an apparatus connection administration unit 34, an apparatus operation administration unit 36, and an apparatus information memory unit 38.

The apparatus information administration unit 32 receives a registration of an office apparatus 22 from an apparatus administrator and administers the information of the office apparatus 22 by storing the information in the apparatus information memory unit 38. The apparatus connection administration unit 34 performs a connection, a use preparation, and an end for using the office apparatus 22 based on a request from the mobile terminal 12. The apparatus operation administration unit 36 operates the office apparatus 22 based on a request from the mobile terminal 12. The apparatus information memory unit 38 stores information of the office apparatus 22.

Referring to FIG. 4, a portion unnecessary for an explanation of the first embodiment is omitted from the illustration of the processing block.

<<Mobile Terminal>>

Figure 5:
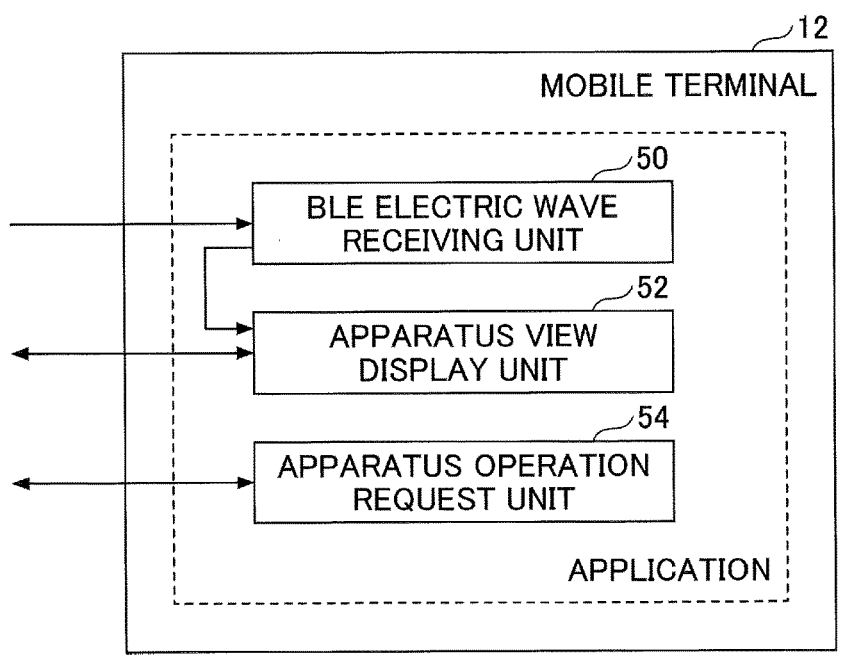
FIG. 5 is an exemplary processing block diagram of a mobile terminal of the embodiment.

The mobile terminal 12 of the first embodiment is substantialized by the processing block illustrated in, for example, FIG. 5. FIG. 5 is an exemplary processing block diagram of an mobile terminal of the first embodiment. Referring to FIG. 5, the mobile terminal 12 substantializes a BLE electric wave receiving unit 50, an apparatus view display unit 52, and an apparatus operation request unit 54 by executing an apparatus.

The BLE electric wave receiving unit 50 receives a BLE electric wave from the office apparatus 22 and provides a meeting room information piece included in the BLE electric wave to the apparatus view display unit 52. The apparatus view display unit 52 displays an apparatus view acquired from the information processing apparatus 10 and receives a start and an end of the meeting from the user when the meeting room information piece is designated. The apparatus operation request unit 54 receives an operation for the office apparatus 22 from the user and sends an apparatus operation request to the information processing apparatus based on the received operation.

For example, the apparatus operation request unit 54 requests the information processing apparatus 10 to send a file output request or a file acquisition request to the office apparatus 22 such as the printer 16A, a projector 18A, and the interactive whiteboard 20A.

Referring to FIG. 5, a portion unnecessary for an explanation of the first embodiment is omitted from the illustration of the processing block.

<<Office Apparatus>>

Figures 6, 7:
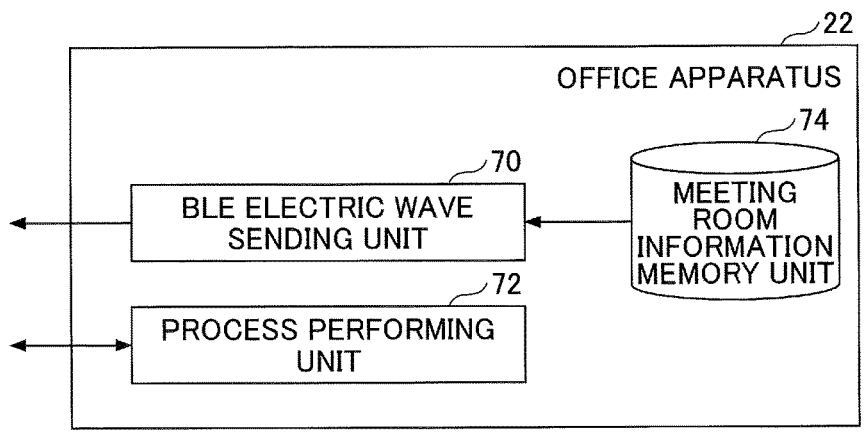
FIG. 6 is an exemplary processing block diagram of the office apparatus of the embodiment.
FIG. 7 illustrates an exemplary structure of information of an office apparatus stored in an apparatus information memory unit.

The office apparatus 22 of the first embodiment is realized by the processing block illustrated in, for example, FIG. 6. FIG. 6 is an exemplary processing block diagram of the office apparatus of the embodiment. Referring to FIG. 6, the office apparatus 22 substantializes a BLE electric wave sending unit 70, a process performing unit 72, and a meeting room information memory unit 74 by executing a program.

The BLE electric wave sending unit 70 reads the meeting room information piece from the meeting room information memory unit 74 and sends the BLE electric wave including the meeting room information piece. The process performing unit 72 performs a process based on the apparatus operation request from the information processing apparatus 10. The meeting room information memory unit 74 stores the meeting room information piece.

Referring to FIG. 6, a portion unnecessary for an explanation of the first embodiment is omitted from the illustration of the processing block.

<<Apparatus Information>>

FIG. 7 illustrates an exemplary structure of information of an office apparatus stored in an apparatus information memory unit. The information (apparatus information) of the office apparatus 22 includes items such as an apparatus, name, an apparatus type, an IP address, and a belonging meeting room.

The apparatus name is a name of the office apparatus 22. The apparatus type indicates a type of the office apparatus 22. The IP address is an example of information for connecting the office apparatus 22. The belonging meeting room is a meeting room in which the office apparatus 22 is installed. The information processing apparatus 10 specifies the meeting room in which the office apparatus 22 is installed by using the meeting room information piece.

<<Meeting Room Information Included in BLE Electric Wave>>

FIG. 8 illustrates an exemplary meeting room information piece included in the BLE electric wave. Referring to FIG. 8, the meeting room information piece included in the BLE electric wave is illustrated for each office apparatus 22. Referring to FIG. 8, the office apparatus 22 causes the meeting room information piece (a meeting room name) for specifying the meeting room, in which the office apparatus 22 is installed, to be included in the BLE electric wave 22 and sends (emits) this BLE electric wave.

<Detailed Process>

Hereinafter, a detailed process of the information processing system 1 of the first embodiment is described. In the information processing system 1 of the first embodiment, as illustrated in, for example, FIG. 9, the information processing apparatus 10, the mobile terminal 12, and the office apparatus 22 cooperate to perform the process.

Figure 9:
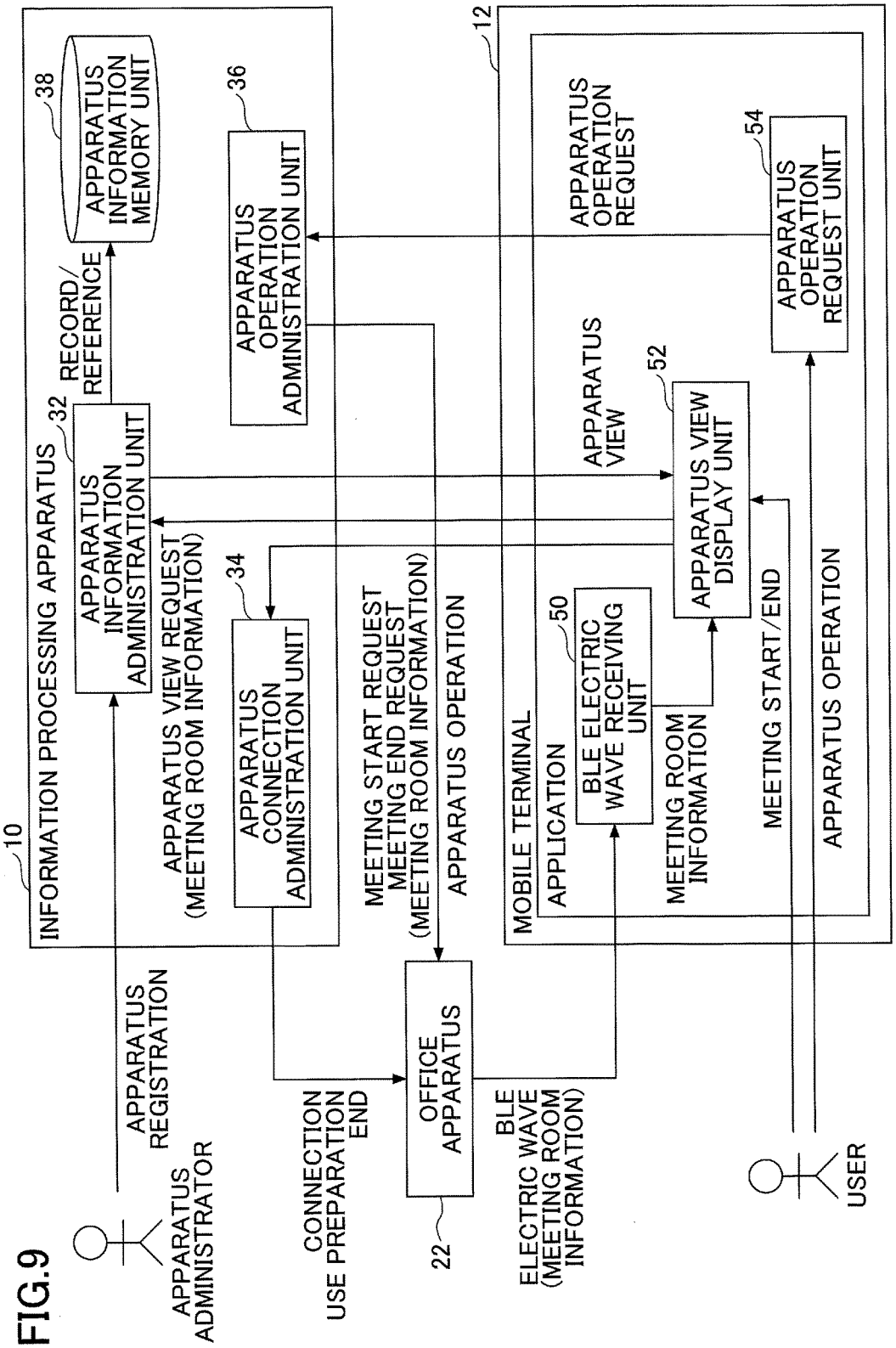
FIG. 9 illustrates an exemplary cooperation of an information processing system of the embodiment.

FIG. 9 illustrates a structure of an exemplary information processing system of the first embodiment. The apparatus information administration unit 32 of the information processing apparatus 19 receives a registration of the information of the office apparatus 22 and causes the information to be stored in the apparatus information memory unit 38. Further, the apparatus information administration unit 32 receives an apparatus view request designating the meeting room information piece from the apparatus view display unit 52 of the mobile terminal 12. The apparatus information administration unit 32 refers to the apparatus information memory unit 38 and returns an apparatus view of the office apparatuses 22 installed in the meeting room specified by the meeting room information piece to the apparatus view display unit 52 of the mobile terminal 12.

The apparatus connection administration unit 34 receives a meeting start request to start the meeting or a meeting end request to end the meeting, in which the meeting room information piece is designated, from the apparatus view display unit 52 of the mobile terminal 12. The apparatus connection administration unit 34 performs a connection, a use preparation, and an end to the office apparatus 22. The apparatus operation administration unit 36 receives an apparatus operation request from the apparatus operation request unit 54 of the mobile terminal 12. The apparatus operation administration unit 36 operates the office apparatus 22 based on the apparatus operation request.

The BLE electric wave receiving unit 50 of the mobile terminal 12 receives the BLE electric wave including the meeting room information piece from the office apparatus 22 and provides the meeting room information piece included in the BLE electric wave to the apparatus view display unit 52. The apparatus view display unit 52 sends an apparatus view request to the apparatus information administration unit 32 of the information processing apparatus 10 by designating the meeting room information piece included in the BLE electric wave. The apparatus view display unit 52 acquires and displays the apparatus view of the office apparatuses 22 installed in the meeting room, which is specified by the meeting room information piece, from the apparatus information administration unit 32 of the information processing apparatus 10.

After the apparatus view display unit 52 displays the apparatus view, the apparatus view display unit 52 receives an instruction to start or end the meeting from the user. After the apparatus view display unit 52 receives the instruction to start or end the meeting from the user, the apparatus view display unit 52 sends a meeting start request to start the meeting or a meeting end request to end the meeting for using the office apparatus 22 to the apparatus connection administration unit 34 of the information processing apparatus 10 by designating the meeting room information piece.

The apparatus operation request unit 54 of the mobile terminal 12 receives an operation to the office apparatus 22 from the user. The apparatus operation request unit 54 sends the apparatus operation request to the apparatus operation administration unit 36 of the information processing apparatus 10 based on the operation received from the user.

Figure 10:
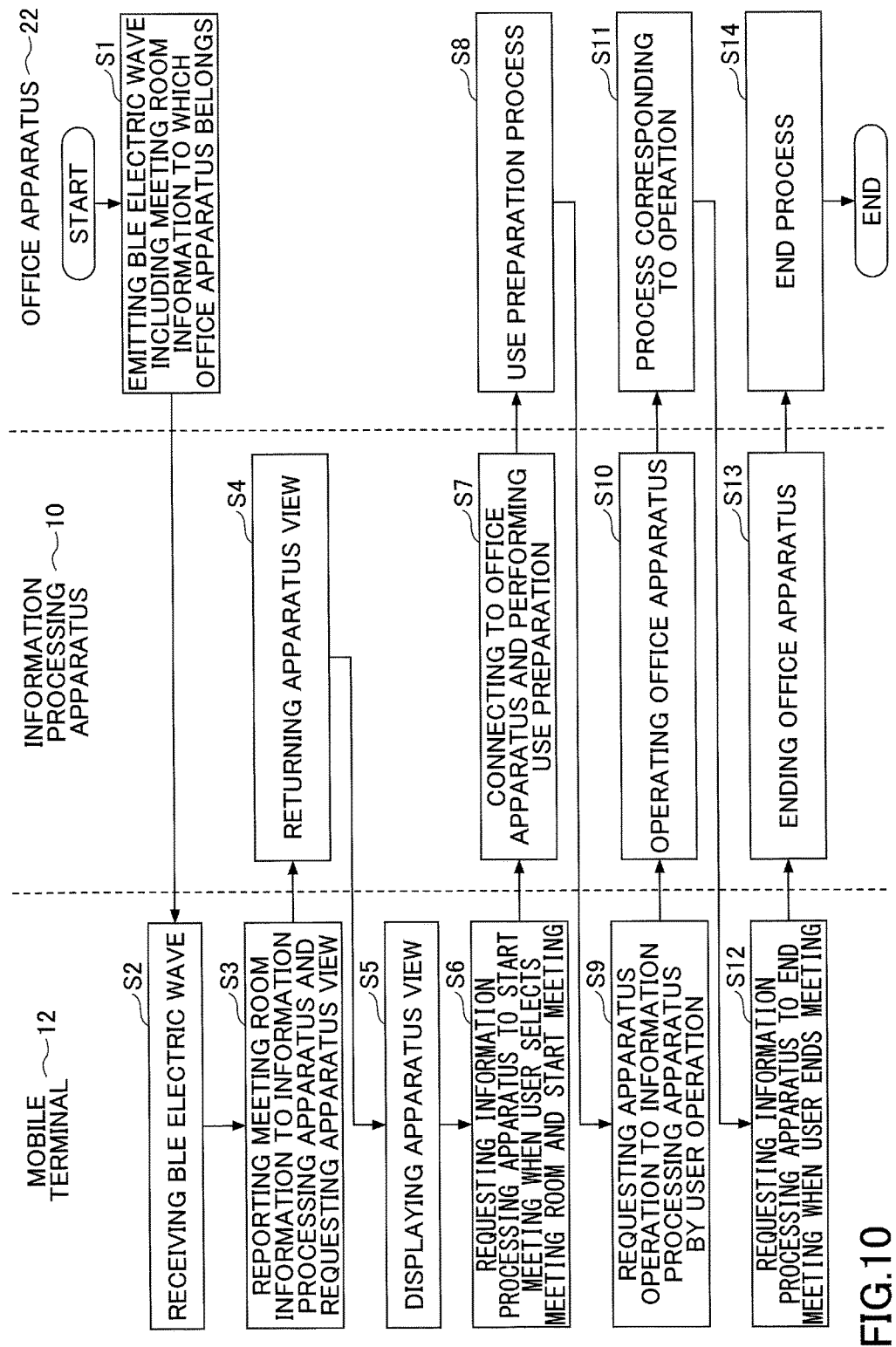
FIG. 10 is a flowchart of an exemplary process performed in the information processing system of the embodiment.

In the information processing system 1 of the first embodiment, the user operates the office apparatus 22 as illustrated in FIG. 10 by using an application of the mobile terminal 12. FIG. 10 is a flowchart of an exemplary process performed in the information processing system of the first embodiment.

In step S1, the office apparatus 22 starts to emit the BLE electric wave including the meeting room information piece specifying the meeting room, to which the office apparatus 22 belongs (in which the office apparatus 22 is installed). While the power of the office apparatus 22 is powered on, the office apparatus 22 continues to emit the BLE electric wave including the meeting room information piece.

In step S2, the mobile terminal 12 receives the BLE electric wave including the meeting room information piece from the office apparatus 22 existing within a reach range of the BLE electric wave. For example, the mobile terminal 12 carried by the user receives the BLE electric wave including the meeting room information when the user approaches a vicinity of the office apparatus 22 installed in the meeting room.

In step S3, the mobile terminal 12 sends an apparatus view request to the information processing apparatus 10 while designating the meeting room information piece included in the BLE electric wave. When the mobile terminal 12 receives the BLE electric wave including multiple different pieces of the meeting room information piece, the mobile terminal 12 sends the apparatus view request to the information processing apparatus 10 while designating the multiple different pieces of the meeting room information piece.

In step S4, the information processing apparatus 10 refers to the apparatus information memory unit 38, creates an apparatus view of the office apparatuses 22 installed in the meeting room specified by the meeting room information piece, and returns the created apparatus view to the apparatus view display unit 52 of the mobile terminal 12. In a case where the apparatus view request designates the multiple pieces of the meeting room information piece, the information processing apparatus 10 groups the apparatus view for each meeting room and returns to the apparatus view display unit 52.

Figure 11:
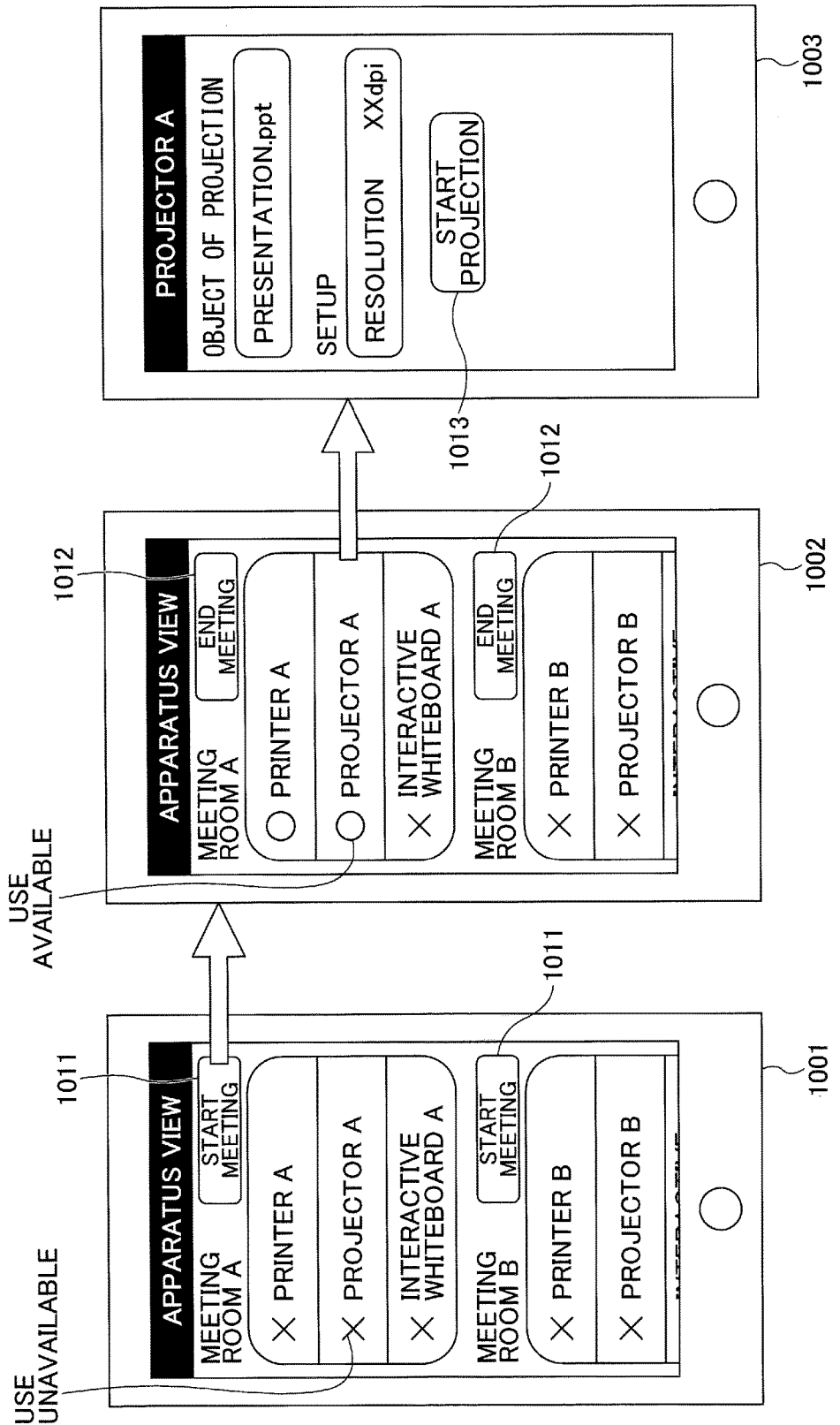
FIG. 11 is an exemplary image diagram of a UI displayed by a mobile terminal.

In step S5, the mobile terminal 12 displays the apparatus view returned from the information processing apparatus 10 using a user interface (UI) as illustrated in, for example, FIG. 11. FIG. 11 is an exemplary image diagram of the UI displayed by the mobile terminal. The UI displayed in step S5 is an apparatus view screen 1001.

The apparatus view is displayed on the apparatus view screen 1001 for each meeting room. A button 1011 of "start meeting" is provided for each meeting room on the apparatus view screen 1001. When the user pushes the button 1011 of "start meeting" on the apparatus view screen 1001, the user selects the meeting room and instructs a start of a meeting. Because the office apparatus 22 does not undergo the use preparation in the stage of step S5, a mark "x" indicating that a use is impossible is displayed before the apparatus name of the office apparatus 22.

In step S6, the user selects the meeting room to be started from the apparatus view screen 1001 and pushes the button 1011 of "start meeting" to instruct the start of the meeting. The mobile terminal 12 requests to start the meeting for using the office apparatus 22 by designating the meeting room information piece for the information processing apparatus 10.

In step S7, the information processing apparatus 10 receives a request to start the meeting from the mobile terminal 12. The request to start the meeting designates the meeting room information piece for using the office apparatus 22. The information processing apparatus 10 connects to the office apparatus 22 installed in the meeting room specified by the meeting room information piece and performs the use preparation. In step S8, the office apparatus 22 performs a use preparation process.

In step S9, the mobile terminal 12 displays the apparatus view screen 1002 illustrated in FIG. 11. On the apparatus view screen 1002, a mark of "o" indicating that the use is possible is displayed before the apparatus name of the office apparatus 22 whose use preparation is completed. On the apparatus view screen 1002, the user selects by pushing an indication of the office apparatus 22 among the office apparatuses 22 whose use becomes possible.

The mobile terminal 12 displays an operation receiving screen 1003 corresponding to the apparatus type of the office apparatus 22 selected by the user. The operation receiving screen 1003 illustrated in FIG. 11 is a screen image in a case where the user selects "projector A". The user instructs an operation to the office apparatus 22 from the operation receiving screen 1003. In an example of the operation receiving screen 1003 illustrated in, for example, FIG. 11, the user sets an object to be projected and a resolution and thereafter pushes a button 1013 of "start projection" so as to start the projection. The mobile terminal 12 sends the apparatus operation request corresponding to an instruction of the operation received from the user to the information processing apparatus 10.

In step S10, the information processing apparatus 10 operates the office apparatus 22 based on the apparatus operation request. In step S11, the office apparatus 22 performs the process based on the apparatus operation request received from the information processing apparatus 10.

In step S12, the user selects the meeting required to be ended in the apparatus view screen 1002 and pushes a button 1012 of "end meeting" so as to instruct to end the meeting. The mobile terminal 12 requests to end the meeting to the information processing apparatus 10 while designating the meeting room information piece.

In step S13, the information processing apparatus 10 receives the request to end the meeting, in which the meeting room information piece is designated, from the mobile terminal 12. The information processing apparatus 10 ends the use of the office apparatus 22 installed in the meeting room specified by the meeting room information piece. In step S14, the office apparatus 22 performs an end process.

In the flowchart illustrated in FIG. 10, after the use preparation of the office apparatus 22 is completed, the mobile terminal 12 operates the office apparatus 22 through the information processing apparatus 10. However, the office apparatus 22 may be directly operated using the mobile terminal 12.

Further, although the apparatus view screens 1001 and 1002 in FIG. 11 are displayed in the order from "meeting room A" to "meeting room B", the display may be an order enabling the user to easily select the meeting room such as an order of a stronger strength of the BLE electric wave.

Figure 12:
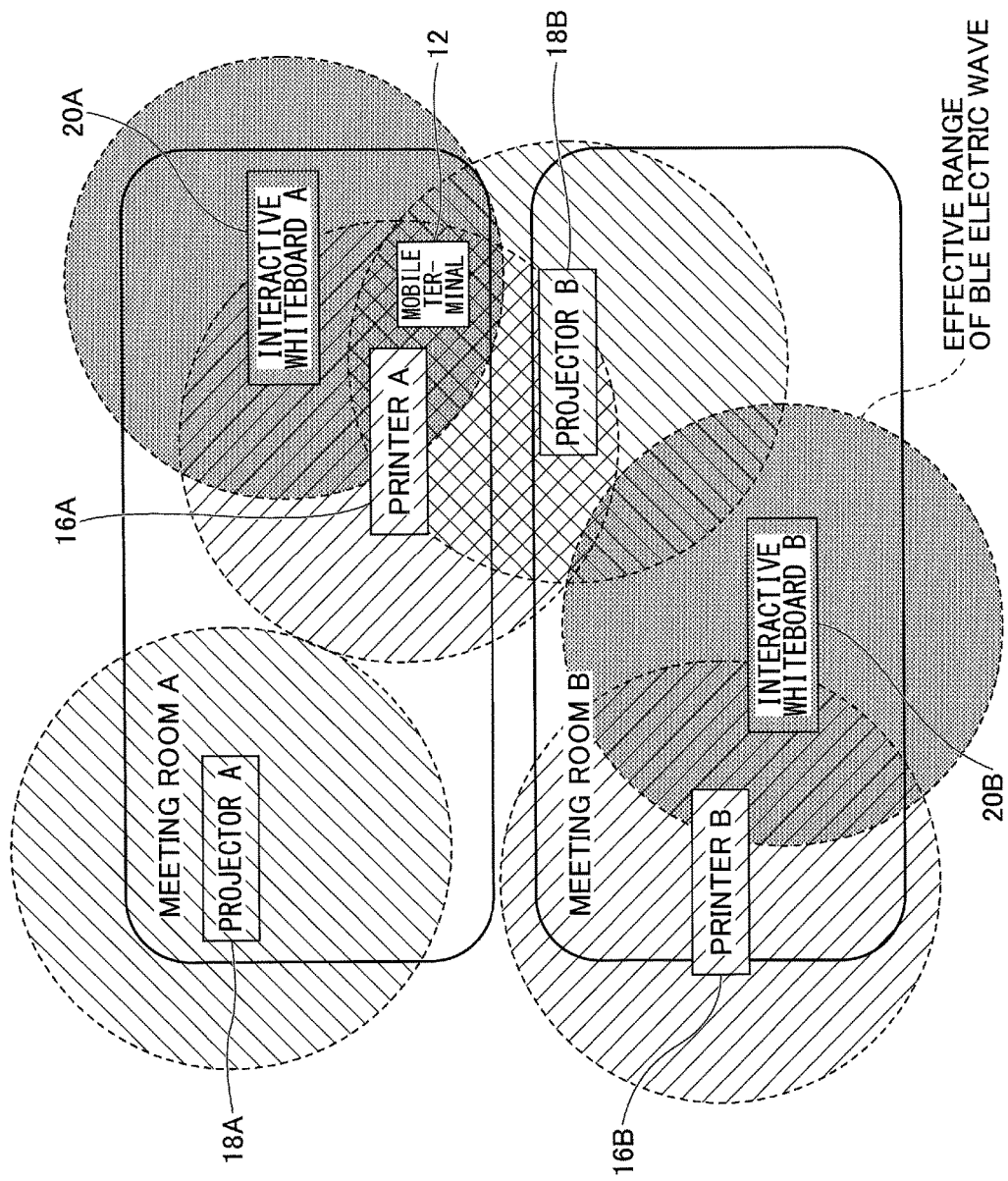
FIG. 12 is an image diagram illustrating an office apparatus arranged in a meeting room and a reach range (an effective range) of a BLE electric wave emitted from the office apparatus.

FIG. 12 is an image diagram illustrating the office apparatus arranged in the meeting room and a reach range (an effective range) of the BLE electric wave emitted from the office apparatus. Referring to FIG. 12, the printer 16A, the projector 18A, and the interactive whiteboard 20A are installed in the meeting room A. Referring to FIG. 12, the printer 16B, the projector 18B, and the interactive whiteboard 20B are installed in the meeting room B.

Referring to FIG. 12, the mobile terminal 12 exists in the meeting room A. Referring to FIG. 12, the mobile terminal 12 receives the BLE electric waves emitted by the printer 16A and the interactive whiteboard 20, which are installed in the meeting room A, and the electric wave emitted by the projector 18B installed in the meeting room B. The BLE electric wave emitted from the printer 16A and the interactive whiteboard 20A includes the meeting room information piece for specifying the meeting room A. The BLE electric wave emitted from the projector 18B includes a meeting room information piece specifying the meeting room B.

Thus, the mobile terminal 12 acquires the meeting room information piece for specifying the meeting rooms A and B from the received BLE electric wave. The mobile terminal 12 requests the information processing apparatus 10 to send the apparatus view while designating the meeting room information piece for specifying the acquired meeting rooms A and B, and displays a view of the office apparatuses 22, which are installed in the meeting rooms A and B, for each meeting room.

Therefore, the mobile terminal 12 displays the apparatus view including the projector 18A in the meeting room A, the printer 16B in the meeting room B, and the interactive whiteboard 20B in the meeting room B, from which the BLE electric waves are not received.

<General Overview>

According to the first embodiment, when the office apparatus 22 installed in the meeting room is used, the apparatus view installed in the meeting room is displayed on the mobile terminal 12 for each meeting room. When the user selects the meeting room from the mobile terminal 12, the office apparatus 22 in the meeting room is enabled to be used using the mobile terminal 12.

According to the first embodiment, in the case where the mobile terminal 12 receives the BLE electric waves from the office apparatuses 22 installed in the multiple meeting rooms as illustrated in FIG. 12, the office apparatus 22 is designated by selecting the meeting room. Therefore, the user easily selects a desired electronic apparatus.

Further, within the first embodiment, in the case where multiple office apparatuses 22 are installed in the meeting room, the meeting room may be selected. Therefore, the multiple office apparatuses 22 installed in the meeting room are easily selected.

Second Embodiment

Within a first embodiment, the meeting is started when the user selects the meeting room from the apparatus view screen 1001. Within the second embodiment, the meeting room is automatically selected and the meeting is started. Because the second embodiment is similar to the first embodiment except for a part of the second embodiment, explanation is appropriately omitted.

Figure 13:
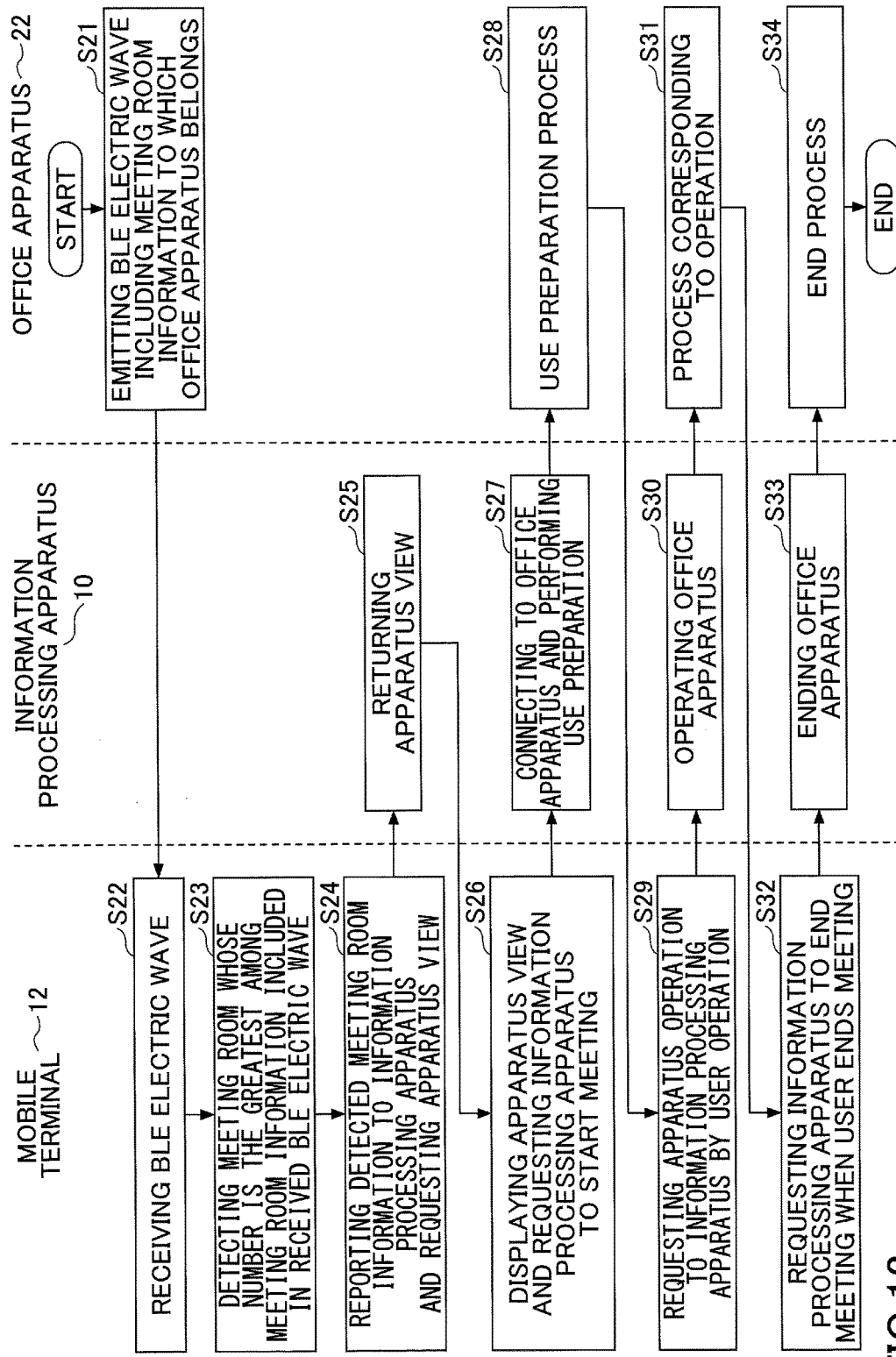
FIG. 13 is a flowchart of another exemplary process performed in the information processing system of the embodiment.

In the information processing system 1 of the second embodiment, the user operates the office apparatus 22 as illustrated in FIG. 13. FIG. 13 is a flowchart of another exemplary process performed in the information processing system of the first embodiment.

The processes of steps S21 and S22 are similar to the processes of steps S1 and S2 of FIG. 10. In step S23, the apparatus view display unit 52 of the mobile terminal 12 detects a meeting room information piece whose number is the greatest among meeting room information pieces included in the received BLE electric waves. For example, in an example of FIG. 12, the meeting room information piece specifying the meeting room A is detected in the example illustrated in FIG. 12.

In step S24, the apparatus view display unit 52 sends an apparatus view request to the information processing apparatus 10 by designating the detected meeting room information piece. In a case where the apparatus view display unit 52 receives the BLE electric waves including different meeting room information pieces, the apparatus view display unit 52 of the mobile terminal 12 automatically designates the meeting room information piece whose number is the greatest among the meeting room information pieces included in the received BLE electric waves and sends the apparatus view request to the information processing apparatus 10.

In step S25, the information processing apparatus 10 refers to the apparatus information memory unit 38, creates an apparatus view of the office apparatuses 22 installed in the meeting room specified by the meeting room information piece, and returns the created apparatus view to the apparatus view display unit 52 of the mobile terminal 12.

In step S26, the mobile terminal 12 displays the apparatus view returned from the information processing apparatus 10. The mobile terminal 12 requests to start the meeting for using the office apparatus 22 by designating the meeting room information piece for the information processing apparatus 10.

Processes on or after step S27 are similar to the processes illustrated in FIG. 10. If the meeting room information piece included in the BLE electric wave in step S23 is one, this meeting room information piece is detected. Referring to FIG. 13, in step S23, the meeting room information piece whose number is the greatest is detected among the meeting room information pieces included in the received BLE electric waves. However, the meeting room information may be detected using information (e.g., the strength of the BLE electric wave) useful for a prediction of the meeting room in which the mobile terminal 12 exists.

Third Embodiment

Within a third embodiment, a security token (hereinafter, simply referred to as a security token) is used. FIG. 14 illustrates another exemplary structure of information of an office apparatus stored in the apparatus information memory unit. Referring to FIG. 14, the information (the apparatus information) of the office apparatus 22 illustrated in FIG. 14 includes a token as an item in addition to the items illustrated in FIG. 7. The office apparatus 22 periodically updates the token and reports the updated token to the information processing apparatus 10. The apparatus information administration unit 32 of the information processing apparatus 10 reflects (updates) the token periodically reported from the office apparatus 22 to the information of the office apparatus 22 illustrated in FIG. 14.

FIG. 15 illustrates an exemplary meeting room information piece and an exemplary token which are included in the BLE electric wave. Referring to FIG. 15, the office apparatus 22 causes the meeting room information piece (a meeting room name) for specifying the meeting room, in which the office apparatus 22 is installed, and a token to be included in the BLE electric wave 22 and sends (emits) this BLE electric wave.

Figure 16:
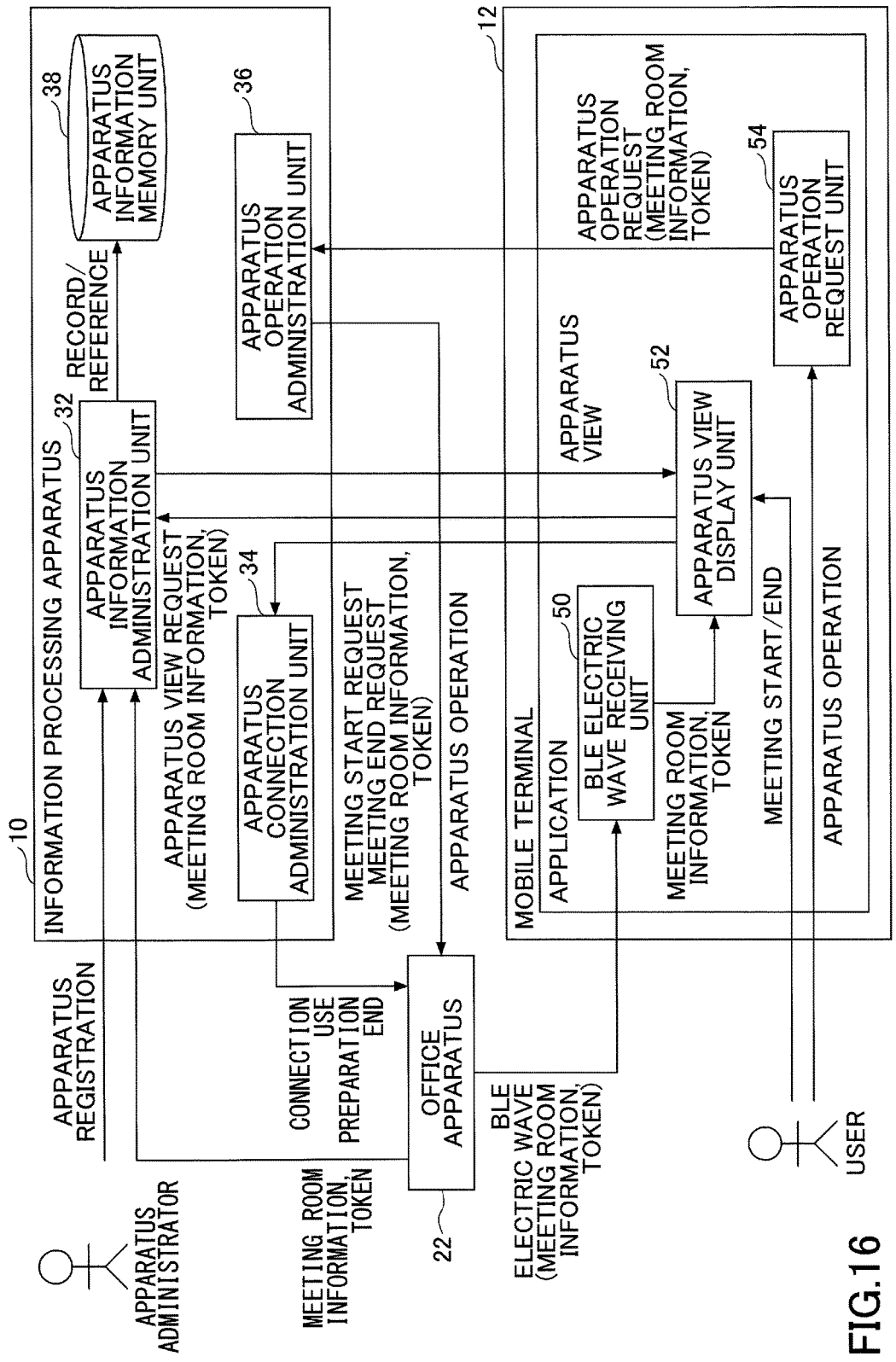
FIG. 16 illustrates another exemplary cooperation of the information processing system of the embodiment.

In the information processing system 1 of the third embodiment, as illustrated in, for example, FIG. 16, the information processing apparatus 10, the mobile terminal 12, and the office apparatus 22 cooperate to perform the process.

FIG. 16 illustrates another exemplary cooperation of the information processing system of the third embodiment. The apparatus information administration unit 32 of the information processing apparatus 19 receives a registration of the information of the office apparatus 22 as illustrated in FIG. 14 from an apparatus administrator and causes the information to be stored in the apparatus information memory unit 38.

Further, the token is periodically reported from the office apparatus 22 to the apparatus information administration unit 32, and the reported token is reflected to the information of the office apparatus 22 illustrated in FIG. 14. Further, the apparatus information administration unit. 32 receives an apparatus view request designating the meeting room information piece and the token from the apparatus view display unit 52 of the mobile terminal 12. The apparatus information administration unit 32 refers to the apparatus information memory unit 38 and returns the apparatus view of the office apparatuses 22 installed in the meeting room specified by the meeting room information piece to the apparatus view display unit 52 of the mobile terminal 12.

A match of the tokens is performed by checking whether the token matches any one of tokens associated with the office apparatus 22 installed in the meeting room as illustrated in FIG. 14. As illustrated in FIG. 12, within the embodiment, the match of the tokens is checked to deal with a case where the reach range of the BLE electric wave from the office apparatus 22 installed in the meeting room is beyond the other office apparatus 22. Therefore, the match of the token is checked with a token broadcasted by any one of the office apparatuses 22 grouped within the meeting room.

The apparatus connection administration unit 34 receives a meeting start request to start the meeting or a meeting end request to end the meeting, in which the meeting room information piece and the token are designated, from the apparatus view display unit 52 of the mobile terminal 12. The apparatus connection administration unit 34 performs a connection, a use preparation, and an end to the office apparatus 22 after checking the match of the tokens. The apparatus operation administration unit 36 receives an apparatus operation request from the apparatus operation request unit 54 of the mobile terminal 12. The apparatus operation administration unit 36 operates the office apparatus 22 based on the apparatus operation request.

The BLE electric wave receiving unit 50 of the mobile terminal 12 receives the BLE electric wave including the meeting room information piece and the token from the office apparatus 22 and provides the meeting room information piece and the token, which are included in the BLE electric wave, to the apparatus view display unit 52.

The apparatus view display unit 52 sends an apparatus view request to the apparatus information administration unit 32 of the information processing apparatus 10 by designating the meeting room information piece and the token, which are included in the BLE electric wave. The apparatus view display' unit 52 acquires and displays the apparatus view of the office apparatuses 22 installed in the meeting room, which is specified by the meeting room information piece, from the apparatus information administration unit 32 of the information processing apparatus 10.

After the apparatus view display unit 52 displays the apparatus view, the apparatus view display unit 52 receives an instruction to start or end the meeting from the user. After the apparatus view display unit 52 receives the instruction to start or end the meeting from the user, the apparatus view display unit 52 sends a meeting start request to start the meeting or a meeting end request to end the meeting for using the office apparatus 22 to the apparatus connection administration unit 34 of the information processing apparatus 10 by designating the meeting room information piece and the token.

The apparatus operation request unit 54 of the mobile terminal 12 receives an operation to be performed by the office apparatus 22 from the user. The apparatus operation request unit 54 sends the apparatus operation request to the apparatus operation administration unit 36 of the information processing apparatus 10 while designating the meeting room information piece and the token based on the operation received from the user.

Figure 17:
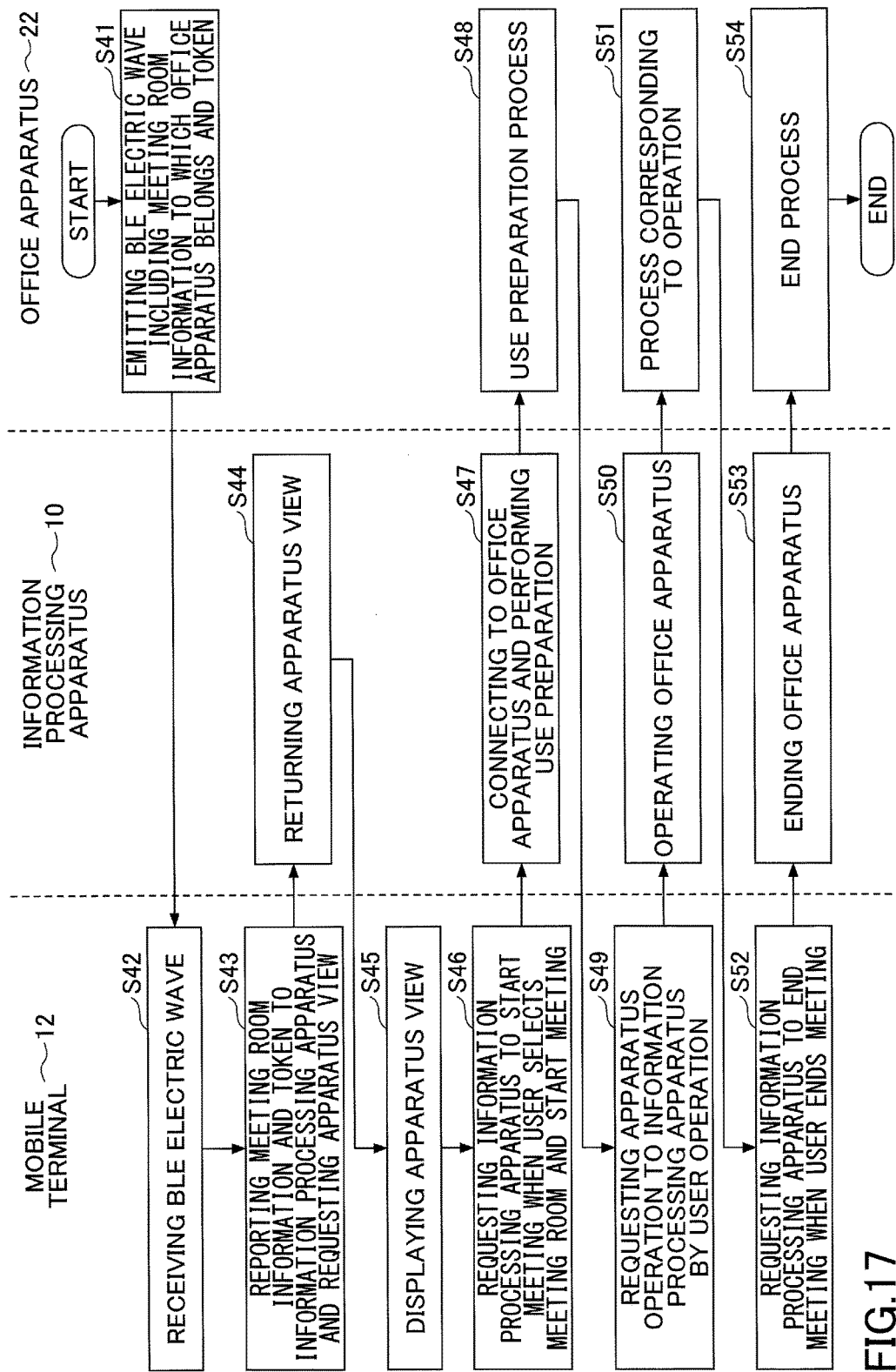
FIG. 17 is a flowchart of another exemplary process performed in the information processing system of the embodiment.

In the information processing system 1 of the third embodiment, the user operates the office apparatus 22 as illustrated in FIG. 17 by using an application of the mobile terminal 12. FIG. 17 is a flowchart of another exemplary process performed in the information processing system of the third embodiment.

In step S41, the office apparatus 22 starts to emit the BLE electric wave including the meeting room information piece specifying the meeting room, to which the office apparatus 22 belongs (in which the office apparatus 22 is installed), and the token. While the power of the office apparatus 22 is powered on, the office apparatus 22 continues to emit the BLE electric wave including the meeting room information piece and the token. In step S42, the mobile terminal 12 receives the BLE electric wave including the meeting room information piece and the token from the office apparatus 22 existing within the reach range of the BLE electric wave.

In step S43, the mobile terminal 12 sends an apparatus view request to the information processing apparatus 10 while designating the meeting room information piece and the token, which are included in the BLE electric wave. In step S44, the information processing apparatus 10 refers to the apparatus information memory unit 38, creates an apparatus view of the office apparatuses 22 installed in the meeting room specified by the meeting room information piece after checking the match of the tokens, and returns the created apparatus view to the apparatus view display unit 52 of the mobile terminal 12.

In step S45, the mobile terminal 12 displays the apparatus view returned from the information processing apparatus 10 using the apparatus view screen 1001 as illustrated in, for example, FIG. 11. When the user pushes the button 1011 of "start meeting" on the apparatus view screen 1001, the user selects the meeting room and instructs a start of a meeting.

In step S46, the user selects the meeting room to be started from the apparatus view screen 1001 and pushes the button 1011 of "start meeting" to instruct the start of the meeting. The mobile terminal 12 requests to start the meeting for using the office apparatus 22 by designating the meeting room information piece and the token for the information processing apparatus 10.

In step S47, the information processing apparatus 10 receives a request to start the meeting from the mobile terminal 12. The request to start the meeting designates the meeting room information piece and the token for using the office apparatus 22. The information processing apparatus 10 connects to the office apparatus 22 installed in the meeting room specified by the meeting room information piece and performs the use preparation after checking the match of the tokens. In step S48, the office apparatus 22 performs the use preparation process.

In step S49, the mobile terminal 12 displays the apparatus view screen 1002 illustrated in FIG. 11. On the apparatus view screen 1002, the mark of "o" indicating that the use is possible is displayed before the apparatus name of the office apparatus 22 whose use preparation is completed. On the apparatus view screen 1002, the user selects by pushing an indication of the office apparatus 22 among the office apparatuses 22 whose use becomes possible.

The mobile terminal 12 displays the operation receiving screen 1003 corresponding to the apparatus type of the office apparatus 22 selected by the user. The user instructs an operation to the office apparatus 22 from the operation receiving screen 1003. The mobile terminal 12 sends the apparatus operation request corresponding to an instruction of the operation received from the user to the information processing apparatus 10 while designating the meeting room information piece and the token.

In step S50, the information processing apparatus 10 operates the office apparatus 22 based on the apparatus operation request after checking the match of the tokens. In step S51, the office apparatus 22 performs the process based on the apparatus operation request received from the information processing apparatus 10.

In step S52, the user selects the meeting required to be ended in the apparatus view screen 1002 and pushes a button 1012 of "end meeting" so as to Instruct to end the meeting. The mobile terminal 12 requests to end the meeting to the information processing apparatus 10 while designating the meeting room information piece and the token.

In step S53, the information processing apparatus 10 receives the request to end the meeting, in which the meeting room information piece and the token are designated, from the mobile terminal 12. The information processing apparatus 10 ends the use of the office apparatus 22 installed in the meeting room specified by the meeting room information piece after checking the match of the tokens. In step S54, the office apparatus 22 performs an end process.

In the flowchart illustrated in FIG. 17, after the use preparation of the office apparatus 22 is completed, the mobile terminal 12 operates the office apparatus 22 through the information processing apparatus 10. However, the office apparatus 22 may be directly operated using the mobile terminal 12.

Within the third embodiment, when the office apparatus 22 installed in the meeting room is used, if the office apparatus 22 becomes once usable from the mobile terminal 12 and then the mobile terminal 12 moves to a place where the mobile terminal 12 cannot receive the BLE electric wave, the office apparatus 22 is not used after updating the token.

Fourth Embodiment

Within the first to third embodiments, the BLE electric wave including the meeting room information is emitted by the office apparatus 22. Within a fourth embodiment, the office apparatus 22 emits the BLE electric wave including the apparatus information such as a MAC address of the office apparatus 22.

<System Structure>

A part of an operation of the information processing system 1 of the fourth embodiment is different from that of the information processing system 1 illustrated in FIG. 1. Therefore, an explanation of the same parts is appropriately omitted.

While the office apparatus 22 is powered on, the office apparatus 22 sends a BLE electric wave including a meeting room information piece. The office apparatus 22 reports Management Information Base (MIB) information to the information processing apparatus 10 using a general-purpose protocol such as a Simple Network Management Protocol (SNMP). The information processing apparatus 10 is enabled to acquire further detailed apparatus information of the office apparatus 22. Further, the information processing apparatus 10 acquires the IP address of the office apparatus 22 by network scanning. The mobile terminal 12 receives the BLE electric wave including the apparatus information and acquires the apparatus information from the BLE electric wave.

<Software Structure>
<<Information Processing Apparatus>>

Figure 18:
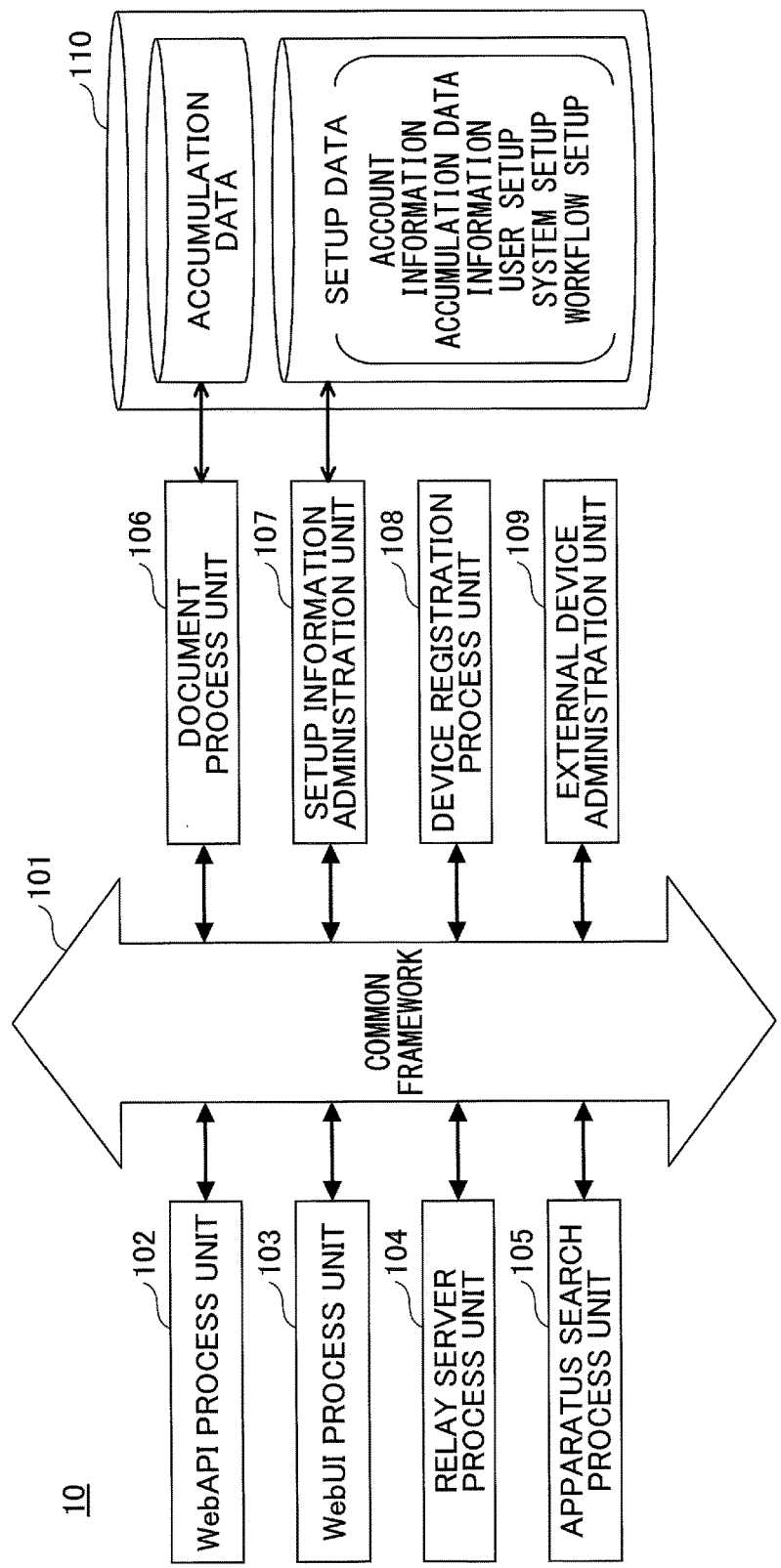
FIG. 18 is another exemplary processing block diagram of the information processing apparatus of the embodiment.

The information processing apparatus 10 of the fourth embodiment is substantialized by the processing block illustrated in, for example, FIG. 18. FIG. 18 is another exemplary processing block diagram of the information processing apparatus of the fourth embodiment. The information processing apparatus 10 substantializes a common framework 101, a WebAPI process unit 102, a WebUI process unit 103, a relay server process unit 104, an apparatus search process unit 105, a document process unit 106, a setup information administration unit 107, a device registration process unit 108, an external device administration unit 109, and a data memory unit 110.

The common framework 101 is a mechanism in which multiple software inside the information processing apparatus 10 mutually communicate and is used to send or receive the request or the data. The WebAPI process unit 102 controls an HTTP(S) request through a WebAPI from the mobile terminal 12 or the office apparatus 22, which are connected to the network.

The Web Application Programming Interface (API) is an interface, which is provided to receive a request from the mobile terminal 12 and the office apparatus 22 and previously determined, and is structured by, for example, a function, a class, or the like. The WebAPI process unit 102 serializes received requests for each request source and sends to each process unit through the common framework 101.

The WebUI process unit 103 controls a display content of the Web server included in the information processing apparatus 10. The WebUI process unit 103 structures a display content in conformity with the setup information and the file content for each user. The relay server process unit 104 monitors whether there is a request accumulated in the relay server 14 for each predetermined period. If there is a request accumulated in the relay server 14, the relay server process unit 104 acquires a request from the relay server 14 and sends the request to each process unit. The relay server process unit 14 receives a process result for the request sent to the process unit from each process unit and reports to the relay server 14.

The document process unit 106 administers the file accumulated in the information processing apparatus 10 as accumulation data. The accumulation data is a file stored in the data memory unit 110 through an SMB, a file made by the information processing apparatus 10, or the like. The document process unit 106 administers the accumulation data and performs a format conversion for the accumulation data.

The format conversion of the accumulation data includes a conversion of an image format and a conversion from a specific application format. The document process unit 106 administers the accumulation data subjected to the format conversion.

The setup information administration unit 107 administers account information, accumulation data information, user setup, system setup, and workflow setup in the data memory unit 110 as setup information. The setup information includes setup information of the user and setup information of the system. The account information includes information for identifying the registered mobile terminal 12, identification information (a user name and a unique user number) of the user using each mobile terminal 12, and authorization information (ID, a password, or the like) for each user.

The accumulation data information includes a data format, a data name, a data quantity, an update date, a kind of a converted data format, a file read date for each user (or each mobile terminal), and so on of each accumulation data accumulated in the information processing apparatus 10. Information or the like related to a setup unique to each user is included in the user setup. The setup information of the system includes information unique to the apparatus, a setup common to all users, or the like.

In a case where the apparatus information of the office apparatus 22 is reported from the mobile terminal 12, the setup information administration unit 107 changes the user setup (a setup of the input output device) associated with the mobile terminal 12 to the office apparatus 22 that is temporarily reported. A period of maintaining the change is a period while a session with the mobile terminal 12 is maintained or a period until when an explicit cutoff request to cut off is received from the mobile terminal 12.

The device registration process unit 108 is a process unit for registering the mobile terminal 12. The device registration process unit 108 displays, for example, a two-dimensional bar code including information necessary for a device registration. The mobile terminal 12 reads, for example, the two-dimensional bar code displayed by a WebUI of the information processing apparatus 10 using a camera functional capability and decodes the two-dimensional bar code. Thus, information for connecting to the information processing apparatus 10 is obtainable.

The apparatus search process unit 105 searches for the IP address of the office apparatus 22 by means of network scanning based on the apparatus information reported from the mobile terminal 12 and acquires the MIB information from the office apparatus 22. After acquiring the MIB information of the office apparatus 22, the apparatus search process unit 105 reports the apparatus information of the office apparatus 22 along with information of the mobile terminal 12 of the report source to the external device administration unit 109.

The external device administration unit 109 the apparatus information of the office apparatus 22 discovered by the apparatus search process unit 105 to the mobile terminal 12 to check whether a setup of the input output device of the information processing apparatus 10 is changed.

The mobile terminal 12 receives a message indicating that the office apparatus 22 is connectable and may select whether the user setup is temporarily overwritten to indicate the input output device of the information processing apparatus 10. If it is selected to overwrite as described above, the external device administration unit 109 temporarily replaces the input output device for the user setup information administered by the setup information administration unit 107 with the office apparatus 22. With this, requests from the mobile terminal 12 on or after this are sent to the office apparatus 22 replaced from the input output device for the user setup information.

Referring to FIG. 18, a portion unnecessary for an explanation of the fourth embodiment is omitted from the illustration of the processing block.

<<Mobile Terminal>>

Figure 19:
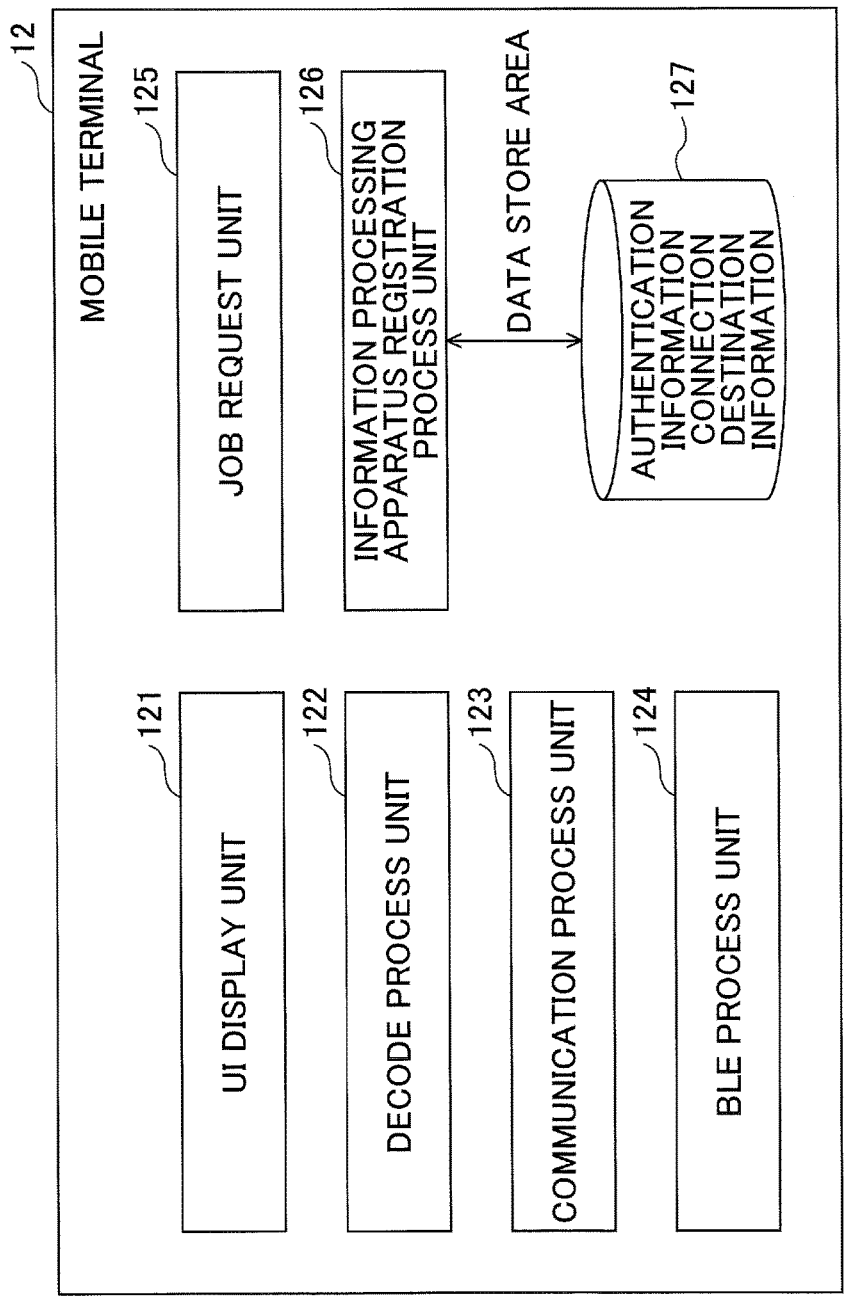
FIG. 19 is another exemplary processing block diagram of the mobile terminal of the embodiment.

The mobile terminal 12 according to the fourth embodiment is structures as illustrated in, for example, FIG. 19. FIG. 19 is another exemplary processing block diagram of the mobile terminal of the fourth embodiment. The mobile terminal 12 illustrated in FIG. 19 substantializes a UI display unit 121, a decode process unit 122, a communication process unit 123, a BLE process unit 124, a job request unit 125, an information processing apparatus registration process unit 126, and a data store unit 127 by executing the application.

The UI display unit 121 is a process unit for controlling a GUI to be displayed for the user and displays a content, registration information, confirmation screen, and so on of the mobile terminal 12. Here, the content is a document stored by the mobile terminal 12 and file view information, a file, and so on, which are acquired from the information processing apparatus 10. The registration information is authentication information, connection destination information for the information processing apparatus 10, information of the input output device set to the information processing apparatus 10, or the like. The confirmation screen includes a selection screen for selecting whether the setup of the information processing apparatus 10 is temporarily changed in a case where the connectable office apparatus 22 is detected.

The decode process unit 122 performs a process of decoding information such as the two-dimensional bar code displayed on the WebUI of the information processing apparatus 10.

The two-dimensional bar code includes network information for connecting to the information processing apparatus 10 and ID information (information for identifying the information processing apparatus 10) used to uniquely identifying the information processing apparatus 10. The decoded information is administered as connection destination information (registration information) of the mobile terminal 12.

The information processing apparatus registration process unit 126 establishes a connection with the information processing apparatus 10 based on the information acquired by the decode process unit 122. If there is no problem in the connection, the information processing apparatus registration process unit 126 registers necessary information in the data store unit 127. The connection such as a LAN connection and a mobile connection to the information processing apparatus 10 is checked.

The job request unit 125 creates a request message in a case where a file view, a file, or the like is requested to be acquired from the information processing apparatus 10. In a case where the file view is acquired, the job request unit 125 creates a message of a file view acquisition request, and sends the created message to the information processing apparatus 10 through the communication process unit 123.

The communication process unit 123 communicates with the information processing apparatus 10. For example, in a case where the mobile terminal 12 and the information processing apparatus 10 are connected by the same network, the mobile terminal 12 communicates with the information processing apparatus 10 through a wired LAN or a wireless LAN. On the other hand, in a case where the mobile terminal 12 and the information processing apparatus 10 are not connected by the same network, the mobile terminal 12 communicates with the information processing apparatus 10 using a data line such as a mobile phone provider.

The BLE process unit analyzes the BLE electric wave emitted from the office apparatus 22 and acquires apparatus information of the office apparatus 22 from the BLE electric wave. The apparatus information is information peculiar to the office apparatus 22 and includes a MAC address for specifying the office apparatus 22.

In a case where the IP address of the office apparatus 22 is fixed, the IP address may be included as apparatus information of the office apparatus 22. The mobile terminal 12 collects the apparatus information acquired by the BLE process unit 124 and reports the collected apparatus information to the information processing apparatus 10.

The information processing apparatus 10 determines whether the office apparatus 22 is connectable to the information processing apparatus 10. In a case where the office apparatus 22 is connectable to the information processing apparatus 10, the information processing apparatus 10 sends a check message indicative of whether the user setup is to be overwritten to add as the office apparatus to the mobile terminal 12. The mobile terminal 12 displays a check screen on the UI display unit 121 and reports a user selection to the information processing apparatus 10.

The information processing apparatus 10 changes information of the input output device set to the information processing apparatus 10 so as to use the office apparatus in the following operation. The BLE process unit 124 reports cutoff information to the information processing apparatus 10 at a time point when the BLE electric wave is not received from the office apparatus 22.

The information processing apparatus 10 returns information of the set input output device back to the original information in a case where the mobile terminal 12 is not operated for a predetermined period. This operation is in consideration of a case where the BLE electric wave is very weak and temporarily cut off. Further, the mobile terminal 12 may explicitly cancel the connection with the office apparatus 22 through the UI display unit 121. In this case, the information processing apparatus 10 returns the information of the set input output device to the original information without being influenced by the state of the BLE electric wave.

<Detailed Process>

Next, a detailed process of the information processing system 1 of the fourth embodiment is described with reference to the sequence diagrams of FIGS. 20 and 21. In the information processing system 1 of the fourth embodiment, as illustrated in, for example, FIG. 20, the information processing apparatus 10, the mobile terminal 12, and the office apparatus 22 cooperate to perform the process.

Figure 20:
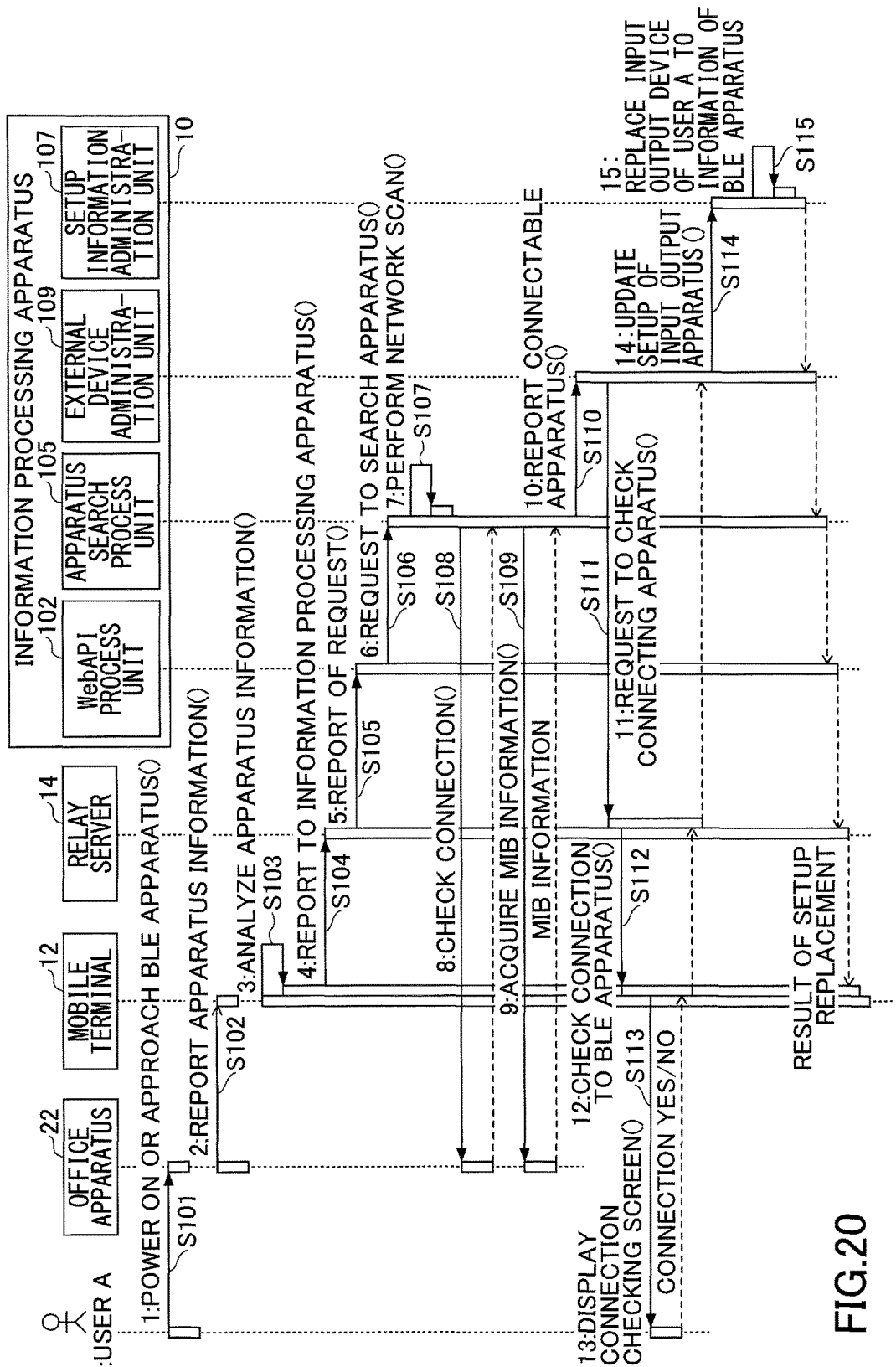
FIG. 20 is a flowchart of an exemplary process performed in the information processing system of the embodiment when a BLE electric wave is detected.

FIG. 20 is a flowchart of an exemplary process performed in the information processing system of the fourth embodiment when the BLE electric wave is detected. In step S101, the office apparatus 22 is powered on, or the user having the mobile terminal 12 approaches the office apparatus 22. In step S102, the mobile terminal 12 receives the BLE electric wave including the apparatus information from the office apparatus 22 existing within the reach range of the BLE electric wave.

In step S103, the mobile terminal 12 analyzes the apparatus information included in the received BLE electric wave. In steps S104 and S105, the mobile terminal 12 reports the apparatus information included in the received BLE electric wave to the information processing apparatus 10.

The WebAPI process unit 102 of the information processing apparatus 10 sends an apparatus search request to the apparatus search process unit 105 in step S106. In step S107, the apparatus search process unit 105 performs a network scan. In step S18, the apparatus search process unit 105 checks a connection with the office apparatus 22 using the IP address acquired by the network scan. In step S109, the apparatus search process unit 105 acquires the MIB information from the connected office apparatus 22.

After acquiring the MIB information of the office apparatus 22 in step S110, the apparatus search process unit 105 reports the apparatus information of the connectable office apparatus 22 along with information of the mobile terminal 12 of the report source to the external device administration unit 109.

In steps S111 to S113, the external device administration unit 109 reports the apparatus information of the connectable office apparatus 22 to the mobile terminal 12 and checks whether the user wishes to change the setup of the input output device of the information processing apparatus 10. Here, the selection is "the setup of the input output device of the information processing apparatus 10 is to change".

The external device administration unit 109 temporarily replaces the input output device for the user setup information administered by the setup information administration unit 107 with the office apparatus 22.

Figure 21:
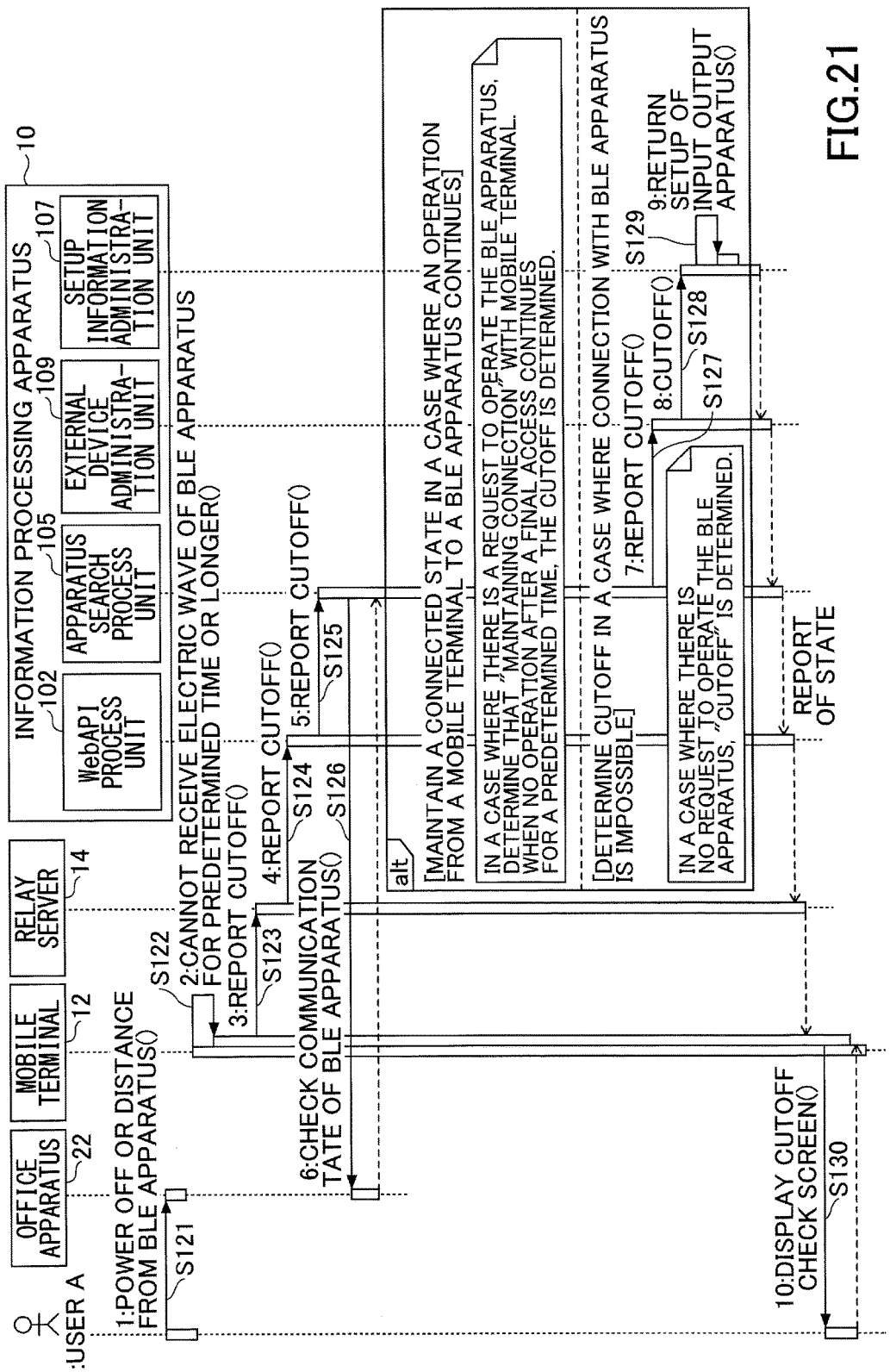
FIG. 21 is a flowchart of an exemplary process performed in the information processing system of the embodiment when a BLE electric wave is no more detected.

FIG. 21 is a flowchart of an exemplary process performed in the information processing system of the fourth embodiment when the BLE electric wave is no more detected. In step S121, the office apparatus 22 is powered off, or the user having the mobile terminal 12 distances from the office apparatus 22. In step S122, the mobile terminal 12 may not receive the BLE electric wave from the office apparatus 22.

In steps S123 and S124, the mobile terminal 12 sends a cutoff report to the information processing apparatus 10. In step S125, the WebAPI process unit 102 of the information processing apparatus 10 sends a cutoff report to the apparatus search process unit 105. In step S126, the apparatus search process unit 105 checks a communication state with the office apparatus 22.

In a case where an operation from the mobile terminal 12 to the office apparatus 22 continues, the apparatus search process unit 105 maintains the connection state with the office apparatus 22. In a case where a predetermined time elapses after the final operation from the mobile terminal 12 to the office apparatus 22, the apparatus search process unit 105 determines the cutoff from the office apparatus 22.

When the connection from the mobile terminal 12 to the office apparatus 22 is disabled, the apparatus search process unit 105 sends a cutoff report to the external device administration unit 109 in step S127. In steps S128 and S129, the external device administration unit 109 temporarily returns the input output device for the user setup information administered by the setup information administration unit 107 back to the original input output device. In step S130, the mobile terminal 12 displays a connection check screen based on the report of the state received from the information processing apparatus 10.

In the sequence diagram illustrated in FIG. 20, it is possible to control a connection from the information processing apparatus 10 to the office apparatus 22 based on the authority set for each user. FIG. 22 illustrates an exemplary structure of an authority table. In an authority table illustrated in FIG. 22, an apparatus type of the office apparatus 22 usable for each user and the functional capability of the office apparatus 22 are set.

For example, an authority check process using the authority table illustrated in FIG. 22 is performed before step S107 illustrated in FIG. 20. The apparatus search process unit 105 checks the authority of the user having the mobile terminal 12 and performs processes on or after step S108 to the office apparatus 22 usable by the user.

Within the fourth embodiment, if the apparatus information included in the BLE electric wave emitted from the office apparatus 22 is an IP address, the meeting room, in which the office apparatus 22 is installed, may be specified using the apparatus information illustrated in FIG. 7. Therefore, the processes may be performed in a manner similar to the first to third embodiments.

Said differently, when the office apparatus 22 installed in the meeting room is used, the apparatus view installed in the meeting room is displayed on the mobile terminal 12 for each meeting room. When the user selects the meeting room from the mobile terminal 12, the office apparatus 22 in the meeting room is enabled to be used using the mobile terminal 12.

<General Overview>

Within the fourth embodiment, the mobile terminal 12 reports the apparatus information of the office apparatus 22 to the information processing apparatus 10 when the mobile terminal 12 detects the BLE electric wave from the office apparatus 22. The information processing apparatus 10 performs a connection with the office apparatus 22 based on the reported apparatus information. If the information processing apparatus 10 and the office apparatus 22 are connectable, the mobile terminal 12 may use the functional capability of the office apparatus 22 by using the functional capability of the information processing apparatus 10.

Therefore, within the fourth embodiment, the user causes the mobile terminal 12 to detect the BLE electric wave by approaching a desired office apparatus 22 and may easily perform an operation of the detected office apparatus 22 from the mobile terminal 12. As described, within the fourth embodiment, the user easily select a desired electronic apparatus.

The meeting room information is an example of belonging information recited in the claim. The BLE electric wave receiving unit 50 is an example of an electric wave receiving unit recited in the claim. The apparatus view display unit 52 is an example of an electronic apparatus display unit recited in the claim. The apparatus information administration unit 32 is an example of an information administration unit recited in the claim. The apparatus information memory unit 38 is a memory unit storing the belonging information and at least one electronic apparatus while associating these. The apparatus connection administration unit 34 is an example of an apparatus connection administration unit recited in the claim. The apparatus operation request unit 54 is an example of an electronic apparatus operation request unit. The apparatus operation administration unit 36 is an example of an apparatus operation administration unit recited in the claim. The token is an example of security information.

According to the embodiment, the user may easily select a desirable electronic apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

What is claimed is:

1. An information processing system including an information processing apparatus and a mobile terminal, which are coupled through a network,
   wherein the mobile terminal comprises:
      a first processor that implements processes of
         receiving information communicated by a short-range wireless communication from an electronic apparatus a plurality of times,
         determining whether the information is received within a predetermined time after the information is received, and
         sending a report to the information processing apparatus when it is determined that the information is not received within the predetermined time, and
   wherein the information processing apparatus comprises
      a second processor that implements processes of
         storing user setup information associating the mobile terminal with an apparatus used by the mobile terminal, and
         changing a state where the mobile terminal is associated with the apparatus to another state when the report is received by the information processing apparatus.

2. The information processing system according to claim 1,
   wherein, in the another state, the mobile terminal is not associated with the apparatus.

3. The information processing system according to claim 1,
   wherein the report is a cutoff report.

4. The information processing system according to claim 1,
   wherein the second processor
      determines, when the report is received by the information processing apparatus, whether an operation is performed from the mobile terminal to the electronic apparatus, and
      changes, when the operation is determined not to be performed, the apparatus to another apparatus associated with the mobile terminal receiving the report.

5. The information processing system according to claim 1,
   wherein the second processor sends information related to a changed user setup to the mobile terminal, and
   wherein the first processor displays a cutoff check screen in response to a receipt of the information related to the changed user setup in the mobile terminal.

6. An information processing apparatus coupled a mobile terminal through a network, the information processing apparatus comprises
   a processor that implements processes of
      storing user setup information associating the mobile terminal with an apparatus used by the mobile terminal, the mobile terminal implementing processes of receiving information communicated by a short-range wireless communication from an electronic apparatus a plurality of times, determining whether the information is received within a predetermined time after the information is received, and sending a report to the information processing apparatus when it is determined that the information is not received within the predetermined time, and
      changing a state where the mobile terminal is associated with the apparatus to another state when the report is received by the information processing apparatus.

7. The information processing apparatus according to claim 6,
   wherein, in the another state, the mobile terminal is not associated with the apparatus.

8. The information processing apparatus according to claim 6,
   wherein the report is a cutoff report.

9. The information processing apparatus according to claim 6,
   wherein, when the report is received by the information processing apparatus, the mobile terminal is caused to determine whether an operation is performed from the mobile terminal to the electronic apparatus, and is caused to change, when the operation is determined not to be performed, the apparatus to another apparatus associated with the mobile terminal receiving the report.

10. The information processing apparatus according to claim 6, wherein the processor sends information related to a changed user setup to the mobile terminal so that the mobile terminal displays a cutoff check screen in response to a receipt of the information related to the changed user setup in the mobile terminal.

11. An information processing method for processing information in an information processing system including an information processing apparatus and a mobile terminal, which are coupled through a network, the information processing method comprising:

receiving, by a first processor included in the mobile terminal, information communicated by a short-range wireless communication from an electronic apparatus a plurality of times;

determining, by the first processor, whether the information is received within a predetermined time after the information is received;

sending, by the first processor, a report to the information processing apparatus when it is determined that the information is not received within the predetermined time;

storing, by a second processor included in the information processing apparatus, user setup information associating the mobile terminal with an apparatus used by the mobile terminal; and changing, by the second processor, a state where the mobile terminal is associated with the apparatus to another state when the report is received by the information processing apparatus.

12. The information processing method according to claim 11,
wherein, in the another state, the mobile terminal is not associated with the apparatus.

13. The information processing method according to claim 11,
wherein the report is a cutoff report.

14. The information processing method according to claim 11, further comprising:
determining, by the second processor, whether an operation is performed from the mobile terminal to the electronic apparatus when the report is received by the information processing apparatus; and
changing, by the second processor, the apparatus to another apparatus associated with the mobile terminal receiving the report when the operation is determined not to be performed.

15. The information processing method according to claim 11, further comprising:
sending, by the second processor, information related to a changed user setup to the mobile terminal, and
displaying, by the first processor, a cutoff check screen in response to a receipt of the information related to the changed user setup in the mobile terminal.

* * * * *